(12) United States Patent
Kwong et al.

(10) Patent No.: US 12,542,908 B2
(45) Date of Patent: Feb. 3, 2026

(54) SYSTEM AND METHOD FOR FACILITATING MACHINE-LEARNING BASED MEDIA COMPRESSION

(71) Applicant: City University of Hong Kong, Kowloon (HK)

(72) Inventors: Sam Tak Wu Kwong, Kowloon (HK); Rongqun Lin, Kowloon (HK); Shiqi Wang, Kowloon (HK)

(73) Assignee: City University of Hong Kong, Kowloon (HK)

( * ) Notice: Subject to any disclaimer, the term of this patent is extended or adjusted under 35 U.S.C. 154(b) by 487 days.

(21) Appl. No.: 18/051,572

(22) Filed: Nov. 1, 2022

(65) Prior Publication Data

US 2024/0146934 A1 May 2, 2024

(51) Int. Cl.
*H04N 19/139* (2014.01)
*H04N 19/13* (2014.01)
*H04N 19/42* (2014.01)

(52) U.S. Cl.
CPC .......... *H04N 19/139* (2014.11); *H04N 19/13* (2014.11); *H04N 19/42* (2014.11)

(58) Field of Classification Search
CPC .. H04N 19/176; H04N 19/172; H04N 19/124; H04N 19/117; H04N 19/159; H04N 19/59; H04N 19/154; H04N 19/46; H04N 19/147; H04N 19/136; G06N 3/045; G06N 3/08; G06N 3/044; G06T 9/002; G06T 2207/20084; G06T 2207/10016; G06T 3/4046

See application file for complete search history.

(56) References Cited

U.S. PATENT DOCUMENTS 10,332,001 B2  6/2019  Rippel et al.
10,623,775 B1  4/2020  Theis et al.
(Continued)

FOREIGN PATENT DOCUMENTS

CN  111405283  9/2022

OTHER PUBLICATIONS

G. J. Sullivan, J.-R. Ohm, W.-J. Han, and T. Wiegand, "Overview of the High Efficiency Video Coding (HEVC) Standard," IEEE Transactions on Circuits and Systems for Video Technology, vol. 22, No. 12, pp. 1649-1668, 2012.
(Continued)

*Primary Examiner* — Farhan Mahmud
(74) *Attorney, Agent, or Firm* — Renner, Kenner, Greive, Bobak, Taylor & Weber

(57) ABSTRACT

A computer-implemented method for facilitating machine-learning based media (e.g., video) compression. The method includes receiving a motion data set associated with motion-related difference between a first image and a second image, and processing the motion data set using a neural network to determine a plurality of motion data subsets. The method also includes processing the plurality of motion data subsets using one or more features associated with the first image to obtain a plurality of motion-warped feature data sets each associated with a respective motion data subset; and processing the plurality of motion-warped feature data sets to facilitate generation of context data for facilitating conditional coding based compression of the second image.

24 Claims, 15 Drawing Sheets

(56) References Cited

U.S. PATENT DOCUMENTS

| | | | |
|---|---|---|---|
| 10,977,553 B2 | 4/2021 | Rippel et al. | |
| 2022/0394240 A1* | 12/2022 | Zhang | H04N 19/593 |

OTHER PUBLICATIONS

J. Zhang, C. Jia, M. Lei, S. Wang, S. Ma, and W. Gao, "Recent development of AVS Video Coding Standard: AVS3," in 2019 Picture Coding Symposium (PCS), 2019, pp. 1-5.

B. Bross, J. Chen, J.-R. Ohm, G. J. Sullivan, and Y.-K. Wang, "Developments in international video coding standardization after AVC, with an overview of Versatile Video Coding (VVC)," Proceedings of the IEEE, vol. 109, No. 9, pp. 1463-1493, 2021.

S. Ma, X. Zhang, C. Jia, Z. Zhao, S. Wang, and S. Wang, "Image and video compression with neural networks: A review," IEEE Transactions on Circuits and Systems for Video Technology, vol. 30, No. 6, pp. 1683-1698, 2019.

G. Toderici, S. M. O'Malley, S. J. Hwang, D. Vincent, D. Minnen, S. Baluja, M. Covell, and R. Sukthankar, "Variable rate image compression with recurrent neural networks," arXiv preprint arXiv:1511. 06085, 2015.

G. Toderici, D. Vincent, N. Johnston, S. Jin Hwang, D. Minnen, J. Shor, and M. Covell, "Full resolution image compression with recurrent neural networks," in Proceedings of the IEEE conference on Computer Vision and Pattern Recognition, 2017, pp. 5306-5314.

N. Johnston, D. Vincent, D. Minnen, M. Covell, S. Singh, T. Chinen, S. J. Hwang, J. Shor, and G. Toderici, "Improved lossy image compression with priming and spatially adaptive bit rates for recurrent networks," in Proceedings of the IEEE Conference on Computer Vision and Pattern Recognition, 2018, pp. 4385-4393.

J. Balle, V. Laparra, and E. P. Simoncelli, "End-to-end optimized image compression," arXiv preprint arXiv:1611.01704, 2016.

J. Balle, D. Minnen, S. Singh, S. J. Hwang, and N. Johnston, "Vari-ational image compression with a scale hyperprior," arXiv preprint arXiv:1802.01436, 2018.

D. Minnen, J. Balle, and G. D. Toderici, "Joint autoregressive and hierarchical priors for learned image compression," Advances in neural information processing systems, vol. 31, 2018.

Z. Cheng, H. Sun, M. Takeuchi, and J. Katto, "Learned image compression with discretized gaussian mixture likelihoods and attention modules," in Proceedings of the IEEE/CVF Conference on Computer Vision and Pattern Recognition, 2020, pp. 7939-7948.

D. He, Y. Zheng, B. Sun, Y. Wang, and H. Qin, "Checkerboard context model for efficient learned image compression," in Proceedings of the IEEE/CVF Conference on Computer Vision and Pattern Recognition, 2021, pp. 14771-14780.

G. Lu, W. Ouyang, D. Xu, X. Zhang, C. Cai, and Z. Gao, "DVC: An end-to-end deep video compression framework," in Proceedings of the IEEE Conference on Computer Vision and Pattern Recognition, 2019, pp. 11006-11015.

A. Habibian, T. v. Rozendaal, J. M. Tomczak, and T. S. Cohen, "Video compression with rate-distortion autoencoders," In Proceedings of the IEEE/CVF International Conference on Computer Vision, 2019, pp. 7033-7042.

A. Djelouah, J. Campos, S. Schaub-Meyer, and C. Schroers, "Neural inter-frame compression for video coding," in Proceedings of the IEEE/CVF International Conference on Computer Vision, 2019, pp. 6421-6429.

O. Rippel, S. Nair, C. Lew, S. Branson, A. G. Anderson, and L. Bourdev, "Learned video compression," in Proceedings of the IEEE/CVF International Conference on Computer Vision, 2019, pp. 3454-3463.

E. Agustsson, D. Minnen, N. Johnston, J. Balle, S. J. Hwang, and G. Toderici, "Scale-space flow for end-to-end optimized video compression," in Proceedings of the IEEE/CVF Conference on Computer Vision and Pattern Recognition, 2020, pp. 8503-8512.

G. Lu, C. Cai, X. Zhang, L. Chen, W. Ouyang, D. Xu, and Z. Gao, "Content adaptive and error propagation aware deep video compression," 2020.

Z. Hu, Z. Chen, D. Xu, G. Lu, W. Ouyang, and S. Gu, "Improving deep video compression by resolution-adaptive flow coding," in European Conference on Computer Vision. Springer, 2020, pp. 193-209.

J. Lin, D. Liu, H. Li, and F. Wu, "M-LVC: Multiple frames prediction for learned video compression," in Proceedings of the IEEE/CVF Conference on Computer Vision and Pattern Recognition, 2020, pp. 3546-3554.

R. Yang, F. Mentzer, L. V. Gool, and R. Timofte, "Learning for video compression with hierarchical quality and recurrent enhancement," in Proceedings of the IEEE/CVF Conference on Computer Vision and Pattern Recognition, 2020, pp. 6628-6637.

R. Yang, F. Mentzer, L. Van Gool, and R. Timofte, "Learning for video compression with recurrent auto-encoder and recurrent probability model," IEEE Journal of Selected Topics in Signal Processing, vol. 15, No. 2, pp. 388-401, 2020.

J. Li, B. Li, and Y. Lu, "Deep contextual video compression," Advances in Neural Information Processing Systems, vol. 34, 2021.

Z. Hu, G. Lu, and D. Xu, "FVC: A new framework towards deep video compression in feature space," in Proceedings of the IEEE/CVF Conference on Computer Vision and Pattern Recognition, 2021, pp. 1502-1511.

S. T. H. Shah and X. Xuezhi, "Traditional and modern strategies for optical flow: an investigation," SN Applied Sciences, vol. 3, No. 3, pp. 1-14, 2021.

B. Girod, "Why b-pictures work: A theory of multi-hypothesis motioncompensated prediction," in Proceedings 1998 International Conference on Image Processing. ICIP98 (Cat. No. 98CB36269), vol. 2. IEEE, 1998, pp. 213-217.

B. Girod, "Efficiency analysis of multihypothesis motion-compensated prediction for video coding," IEEE Transactions on Image Processing, vol. 9, No. 2, pp. 173-183, 2000.

M. Flierl, T. Wiegand, and B. Girod, "Rate-constrained multihypothesis prediction for motion-compensated video compression," IEEE Transactions on Circuits and Systems for Video Technology, vol. 12, No. 11, pp. 957-969, 2002.

M. T. Orchard and G. J. Sullivan, "Overlapped block motion compensation: An estimation-theoretic approach," IEEE Transactions on Image Processing, vol. 3, No. 5, pp. 693-699, 1994.

G. Sullivan, "Multi-hypothesis motion compensation for low bit-rate video coding," in 1993 IEEE International Conference on Acoustics, Speech, and Signal Processing, vol. 5. IEEE, 1993, pp. 437-440.

Z. Wang, S. Wang, X. Zhang, S. Wang, and S. Ma, "Multi-hypothesis prediction based on implicit motion vector derivation for video coding," in 2018 25th IEEE International Conference on Image Processing (ICIP). IEEE, 2018, pp. 2541-2545.

G. K. Wallace, "The JPEG still picture compression standard," IEEE transactions on consumer electronics, vol. 38, No. 1, pp. xviii-xxxiv, 1992.

D. S. Taubman and M. W. Marcellin, "JPEG2000: Standard for interactive imaging," Proceedings of the IEEE, vol. 90, No. 8, pp. 1336-1357, 2002.

F. Bellard, "BPG image format," 2015. [Online]. Available: https://bellard.org/bpg/.

C.-Y. Wu, N. Singhal, and P. Krahenbuhl, "Video compression through image interpolation," in Proceedings of the European conference on computer vision (ECCV), 2018, pp. 416-431.

J. Pessoa, H. Aidos, P. Tomas, and M. A. Figueiredo, "End-to-end learning of video compression using spatio-temporal autoencoders," in 2020 IEEE Workshop on Signal Processing Systems (SiPS). IEEE, 2020, pp. 1-6.

M. Liou, "Overview of the px64 kbit/s video coding standard," Communications of the ACM, vol. 34, No. 4, pp. 59-63, 1991.

S.-W. Wu and A. Gersho, "Joint estimation of forward and backward motion vectors for interpolative prediction of video," IEEE Transactions on Image Processing, vol. 3, No. 5, pp. 684-687, 1994.

M. Flierl, T. Wiegand, and B. Girod, "A locally optimal design algorithm for block-based multi-hypothesis motion-compensated prediction," in Proceedings DCC'98 Data Compression Conference (Cat. No. 98TB100225). IEEE, 1998, pp. 239-248.

W.-Y. Kung, C.-S. Kim, and C.-C. Kuo, "Multi-hypothesis motion compensated prediction (mhmcp) for error-resilient visual commu-

(56) References Cited

OTHER PUBLICATIONS nication," in Proceedings of 2004 International Symposium on Intelligent Multimedia, Video and Speech Processing, 2004. IEEE, 2004, pp. 45-48.

W.-Y. Kung, C.-S. Kim, and C.-C. J. Kuo, "Analysis of multi-hypothesis motion compensated prediction for robust video transmission," in 2004 IEEE International Symposium on Circuits and Systems (ISCAS), vol. 3. IEEE, 2004, pp. III-761.

A. Ranjan and M. J. Black, "Optical flow estimation using a spatial pyramid network," in 2017 IEEE Conference on Computer Vision and Pattern Recognition (CVPR), 2017, pp. 2720-2729.

K. C. Chan, X. Wang, K. Yu, C. Dong, and C. C. Loy, "Understanding deformable alignment in video super-resolution," arXiv preprint arXiv:2009.07265, vol. 4, No. 3, p. 4, 2020.

T. Xue, B. Chen, J. Wu, D. Wei, and W. T. Freeman, "Video enhancement with task-oriented flow," International Journal of Computer Vision, vol. 127, No. 8, pp. 1106-1125, 2019.

A. Mercat, M. Viitanen, and J. Vanne, "UVG dataset: 50/120fps 4k sequences for video codec analysis and development," in Proceedings of the 11th ACM Multimedia Systems Conference, 2020, pp. 297-302.

A. Paszke, S. Gross, F. Massa, A. Lerer, J. Bradbury, G. Chanan, T. Killeen, Z. Lin, N. Gimelshein, L. Antiga et al., "Pytorch: An imperative style, high-performance deep learning library," Advances in neural information processing systems, vol. 32, 2019.

J. Begaint, F. Racap' e, S. Feltman, and A. Pushparaja, "Compressai: a pytorch library and evaluation platform for end-to-end compression research," arXiv preprint arXiv:2011.03029, 2020.

D. P. Kingma and J. Ba, "Adam: A method for stochastic optimization," arXiv preprint arXiv:1412.6980, 2014.

R. Yang, L. Van Gool, and R. Timofte, "OpenDVC: An open source implementation of the DVC video compression method," arXiv preprint arXiv:2006.15862, 2020.

G. Bjøntegaard, "Calculation of average PSNR differences between RDcurves (VCEG-M33)," in VCEG Meeting (ITU-T SG16 Q. 6), 2001, pp. 2-4.

\* cited by examiner

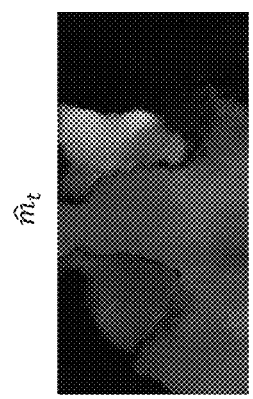
$\hat{m}_t$
Figure 3A
$\hat{x}_t$
Figure 3B
$m_t^1$
Figure 3C
$m_t^2$
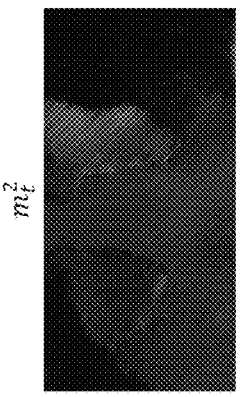
Figure 3D
$m_t^3$
Figure 3E
$m_t^4$
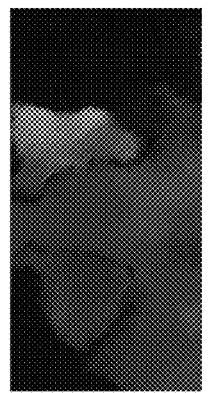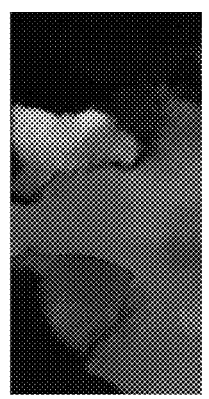
Figure 3F
$m_t^5$
Figure 3G
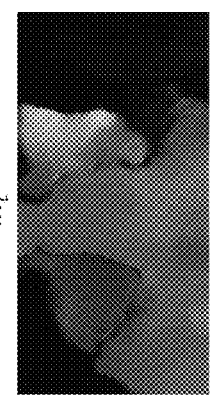
$m_t^6$
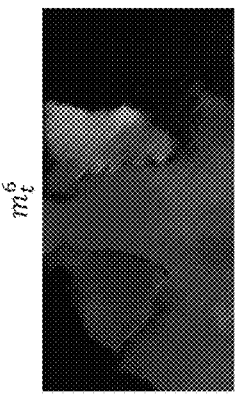
Figure 3H

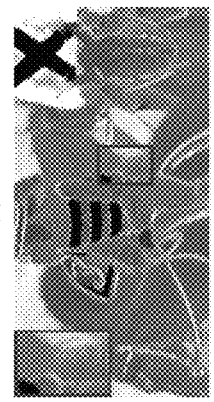
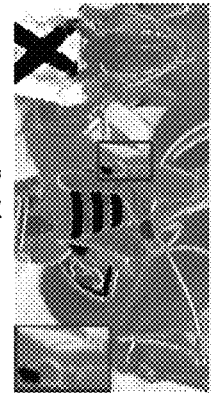
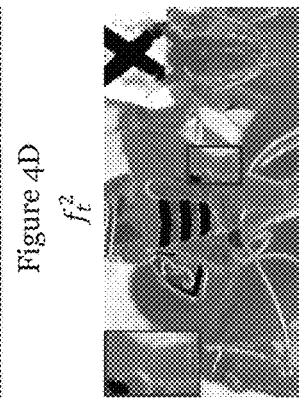
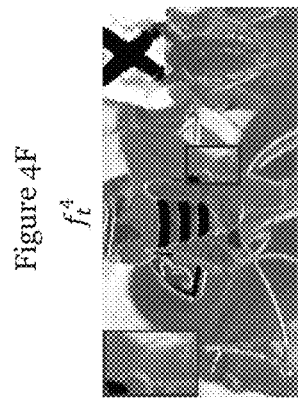

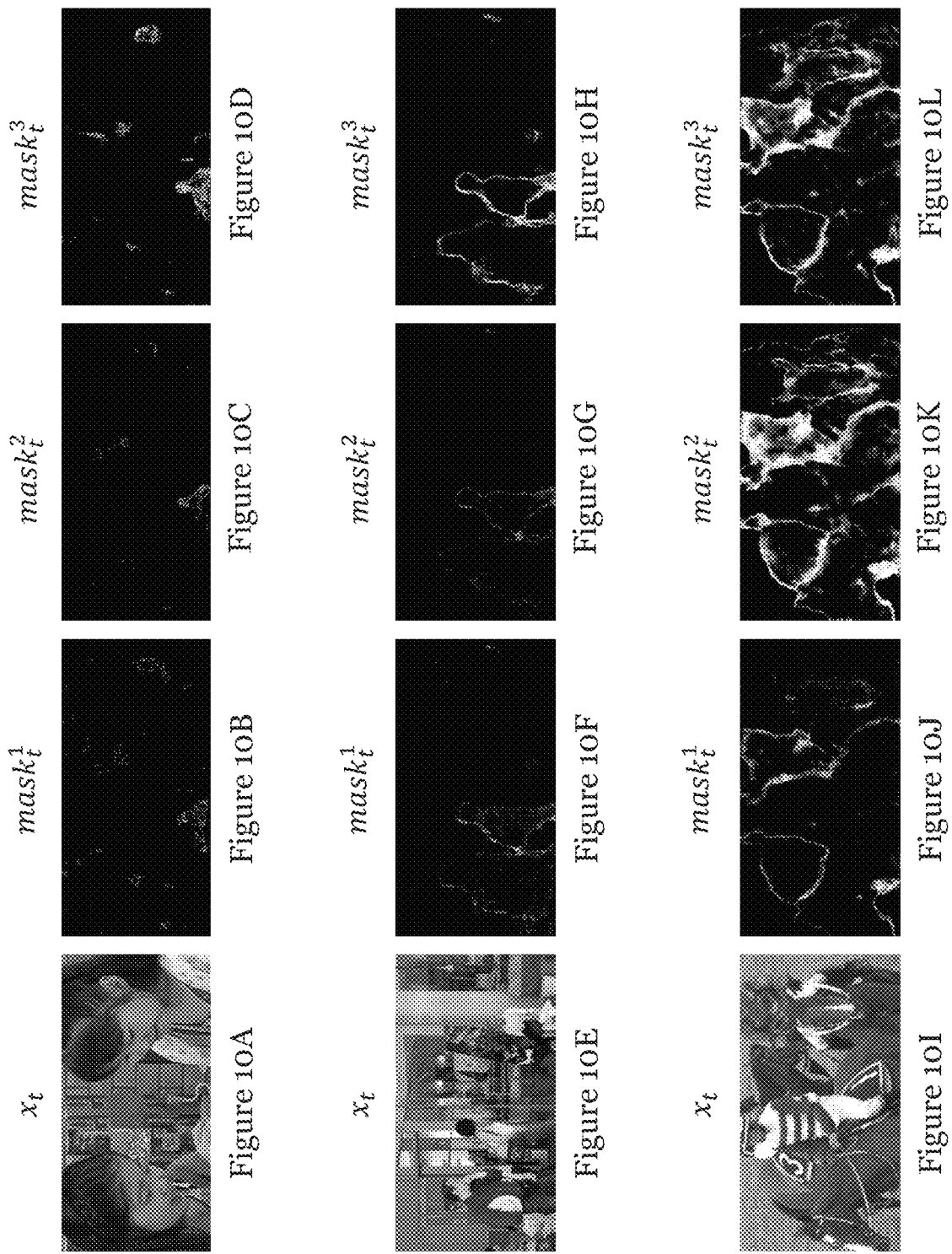

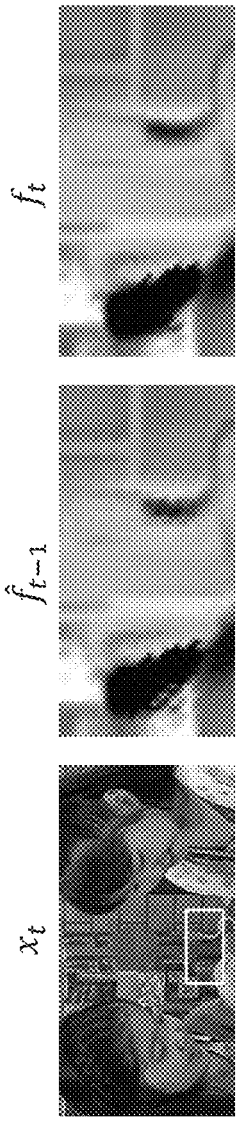
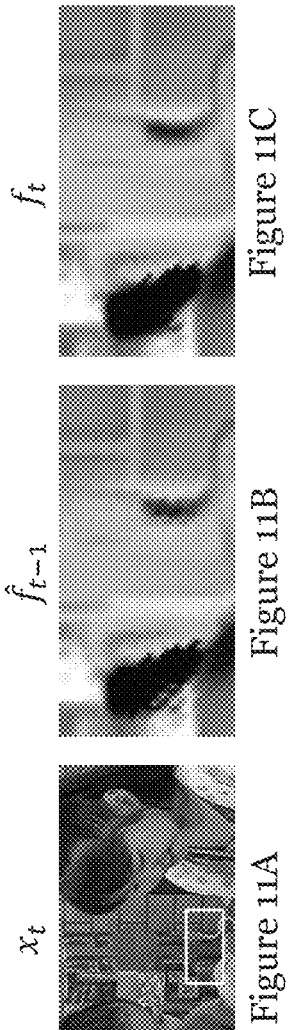
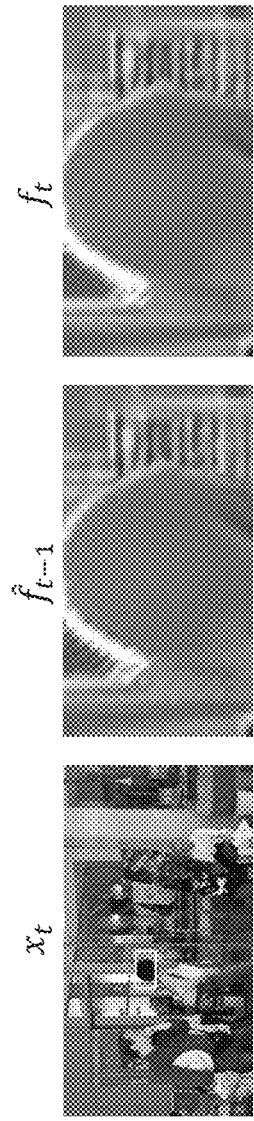
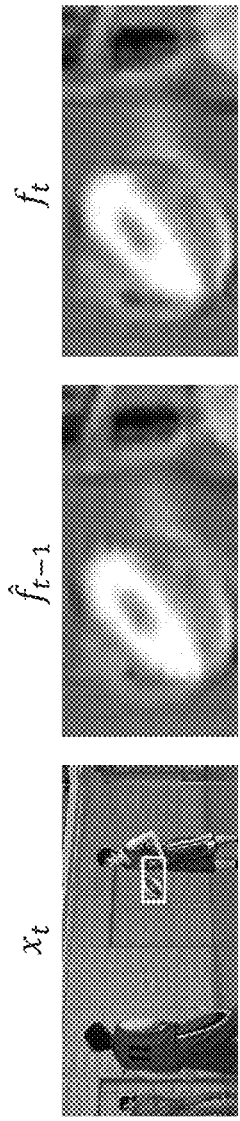
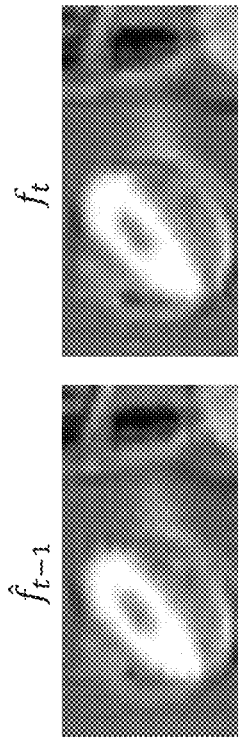
Figure 11A  Figure 11B  Figure 11C  Figure 11D  Figure 11E  Figure 11F  Figure 11G  Figure 11H  Figure 11I

SYSTEM AND METHOD FOR FACILITATING MACHINE-LEARNING BASED MEDIA COMPRESSION

TECHNICAL FIELD

This invention relates to system and method for facilitating machine-learning based media (such as image or video) compression.

BACKGROUND

Hybrid video coding is a known video coding framework, which generally includes prediction, transformation, quantization, and entropy coding. Various video coding standards such as high efficiency video coding (HEVC), audio and video coding (AVS), and versatile video coding (VVC) can achieve good compression efficiency.

Recent advancement in machine-learning based ("learned") image/video compression has propelled further exploration of the data-driven compression scheme. Some existing learned image compression methods can obtain improved compression performance over traditional image coding methods by converting the visual information into the compact latent code using a learned encoder. On the other hand, some existing learned video compression methods, benefited from traditional hybrid video compression structure, apply deep neural networks to construct the video encoder-decoder and train the deep neural networks in an end-to-end manner to optimize rate-distortion performance. Generally, end-to-end learned video compression methods aim to learn the effective representation for the current frame to remove the spatial redundancy and mine sufficient and efficient temporal information from the reference frame for the removal of the temporal redundancy.

Existing end-to-end learned video compression methods can be roughly divided into two categories based on temporal alignment strategies. The first category utilizes the optical flow based motion estimation to achieve the temporal alignment, and the optical flow map is further compressed into the bitstream. The second category estimates and compresses the offset map as motion, and the reconstructed offset map is utilized to align the features through the deformable convolution. For both categories, it would be ideal to be able to obtain better alignment with fewer bits.

Motion estimation and compensation have long been the problems in the hybrid video coding framework. It is known that the complex motions with occlusions, non-rigid variations, brightness changing blur, etc., can be challenging to model. Also, the varying pixel intensities of the subject may give rise to the misalignment issue and inaccurate prediction, as there may exist a large gap for the warped frame compared to the current frame. Moreover, one optical flow can only achieve one-to-one warping, which may limit the mining of temporal information. Therefore, it may be advantageous to improve the temporal alignment to reduce the temporal redundancies towards high efficiency video compression.

While it has been acknowledged that a larger number of candidate reference samples in the reference should be exploited for better temporal alignment, in existing learned video compression methods, the motion used for alignment is limited to one hypothesis only, where the sample in the current to-be-coded frame can only refer to one sample in the reference frame by the flow based warping. As a result, these methods may suffer from inaccurate motion estimation, in particular for complicated scenes with complex movements.

SUMMARY OF THE INVENTION

In a first aspect, there is provided a computer-implemented method for facilitating machine-learning based media compression, comprising: (a) receiving a motion data set associated with motion-related difference between a first image and a second image; (b) processing the motion data set using a neural network to determine a plurality of motion data subsets; (c) processing the plurality motion data subsets using one or more features associated with the first image to obtain a plurality of motion-warped feature data sets each associated with a respective motion data subset; and (d) processing the plurality of motion-warped feature data sets to facilitate generation of context data for facilitating conditional coding based compression of the second image. The first image and the second image may correspond to consecutive frames of a video, with the first image immediately before the second image. The computer implemented method may be applied to part of or the entirety of a video (with multiple images each corresponding to a respective frame of the video) to facilitate compression of the video.

Optionally, the motion data set comprises a motion vector.

Optionally, the motion vector comprises a reconstructed motion vector $\hat{m}_t$. Optionally, the computer-implemented method further comprises: determining the reconstructed motion vector $\hat{m}_t$.

Optionally, determining the reconstructed motion vector $\hat{m}_t$ comprises: processing the first image and the second image to determine a first motion vector $m_t$ associated with motion-related difference between the first image and the second image; and performing a motion compression operation on the first motion vector $m_t$ to determine the reconstructed motion vector $\hat{m}_t$. The reconstructed motion vector $\hat{m}_t$ corresponds to a second motion vector.

Optionally, the processing includes processing the first image and the second image using a spatial pyramid network (SpyNet) to determine the first motion vector $m_t$.

Optionally, the motion compression operation comprises: encoding the first motion vector based on a hyper-prior based entropy model to obtain motion data bitstream; and decoding the motion data bitstream to obtain the reconstructed motion vector $\hat{m}_t$.

Optionally, encoding the first motion vector comprises processing the first motion vector using an encoder neural network. Optionally, the encoder neural network may belong to a larger neural network that includes, e.g., a decoder neural network.

Optionally, decoding the motion data bitstream comprises processing the motion data bitstream using a decoder neural network. Optionally, the decoder neural network may belong to a larger neural network that includes, e.g., an encoder neural network.

Optionally, each of the plurality of motion data subsets corresponds to a respective motion.

Optionally, (b) comprises: (b1) generating a first motion matrix $M_{ini}$ based on the motion vector; (b2) processing the first motion matrix $M_{ini}$ using a neural network to determine a motion diversity function $F_{div}$; (b3) generating a second motion matrix $M_{final}$ based on the first motion matrix $M_{ini}$ and the motion diversity function $F_{div}$; and (b4) processing the second motion matrix $M_{final}$ to obtain the plurality of motion data subsets.

Optionally, (b1) comprises: duplicating and concatenating the motion vector to obtain the first motion matrix $M_{ini}$.

Optionally, (b3) comprises: generating a second motion matrix $M_{final}$ based on $M_{final}=M_{ini}+F_{div}(M_{ini})$.

Optionally, (b4) comprises: splitting the second motion matrix $M_{final}$ into the plurality of motion data subsets.

Optionally, (c) comprises: (c1) extracting the one or more features from the first image; and (c2) warping each of the plurality motion data subsets with the one or more extracted features associated with the first image to obtain the plurality of motion-warped feature data sets.

Optionally, (c1) comprises: processing the first image using a neural network to extract the one or more features.

Optionally, each of the plurality of motion-warped feature data sets can be represented as a respective motion-warped feature map.

Optionally, (d) comprises: (d1) processing the plurality of motion-warped feature data sets based on an attention based neural network to determine a plurality of attention based weights each associated with a respective one of the plurality of motion-warped feature data sets; and (d2) processing the attention based weights and the plurality of motion-warped feature data sets to generate the context data.

Optionally, the attention based neural network comprises a squeeze-and-excitation layer and a multi-scale neural network.

Optionally, (d1) comprises: generating a feature matrix $M_{fs}$ based on concatenating the plurality of motion-warped feature data sets; processing the feature matrix $M_{fs}$ using the squeeze-and-excitation layer to obtain a re-calibrated feature matrix $\tilde{M}_{fs}$; processing the re-calibrated feature matrix $\tilde{M}_{fs}$ using the multi-scale neural network to determine a weight matrix W. The weight matrix W includes the plurality of attention based weights.

Optionally, (d1) further comprises: applying each of the plurality of attention based weights to a respective one of the plurality of motion-warped feature data sets to obtain a plurality of attention-weighted motion-warped feature data sets.

Optionally, (d2) comprises: processing the plurality of attention-weighted motion-warped feature data sets using a neural network to obtain the context data.

Optionally, the context data is arranged to be applied to an entropy model, e.g., an auto-aggressive entropy model, to facilitate conditional coding based compression of the second image.

Optionally, the computer-implemented method further comprises: (e) performing a conditional compression operation on the second image to obtain a compressed second image.

Optionally, the conditional compression operation comprises: encoding the second image based on an auto-regressive entropy model to obtain a bitstream; and decoding the bitstream to obtain the compressed second image.

Optionally, encoding the second image comprises processing the second image using a conditional encoder neural network. Optionally, the conditional encoder neural network may belong to a larger neural network that includes, e.g., a conditional decoder neural network.

Optionally, decoding the second image comprises processing the second image using a conditional decoder neural network. Optionally, the conditional decoder neural network may belong to a larger neural network that includes, e.g., a conditional encoder neural network.

Optionally, the compressed second image is arranged to be used as a reference image for facilitating processing and compression of another image.

Optionally, the first image is a reference image.

Optionally, the first image is a compressed first image.

Optionally, the computer-implemented method further comprises displaying the second image.

In a second aspect, there is provided a system for facilitating machine-learning based media compression. The system comprises one or more processors and memory storing one or more programs configured to be executed by the one or more processors. The one or more programs include instructions for performing or facilitating performing of the method of the first aspect. The system may also include a display for displaying the media (image, video) processed or being processed (e.g., the second image, the first image, etc.). Optionally, the system is a video delivery system. Optionally, the system is a video storage system. The system may be used to process a video with multiple frames each corresponding to a respective image to facilitate compression of the video.

In a third aspect, there is provided a non-transitory computer-readable storage medium storing one or more programs configured to be executed by one or more processors. The one or more programs include instructions for performing or facilitating performing of the method of the first aspect.

Other features and aspects of the invention will become apparent by consideration of the detailed description and accompanying drawings. Any feature(s) described herein in relation to one aspect or embodiment may be combined with any other feature(s) described herein in relation to any other aspect or embodiment as appropriate and applicable.

BRIEF DESCRIPTION OF THE DRAWINGS

Embodiments of the invention will now be described, by way of example, with reference to the accompanying drawings in which:

FIG. 3A is an image illustrating a motion map associated with a decoded motion vector in one example and used as input in the multiple hypothesis module of FIG. 2;

FIG. 3B is an image of a frame of a video associated with the motion map in FIG. 3A;

FIG. 3C is an image illustrating a motion map associated with a motion in one example;

FIG. 3D is an image illustrating a motion map associated with a motion in one example;

FIG. 3E is an image illustrating a motion map associated with a motion in one example;

FIG. 3F is an image illustrating a motion map associated with a motion in one example;

FIG. 3G is an image illustrating a motion map associated with a motion in one example;

FIG. 3H is an image illustrating a motion map associated with a motion in one example;

FIG. 4A is an image illustrating a reference frame of a video in one example;

FIG. 4B is an image illustrating a current frame of a video in one example;

FIG. 4C is an image illustrating a feature map associated with feature(s) extracted from the reference frame in FIG. 4A;

FIG. 4D is an image illustrating a feature map associated with feature(s) extracted from the reference frame in FIG. 4A warped by a decoded motion vector;

FIG. 4E is an image illustrating a feature map associated with feature(s) extracted from the reference frame in FIG. 4A warped by a learned motion;

FIG. 4F is an image illustrating a feature map associated with feature(s) extracted from the reference frame in FIG. 4A warped by a learned motion FIG. 4G is an image illustrating a feature map associated with feature(s) extracted from the reference frame in FIG. 4A warped by a learned motion FIG. 4H is an image illustrating a feature map associated with feature(s) extracted from the reference frame in FIG. 4A warped by a learned motion;

FIG. 10A is an image illustrating a current frame of a video in one example;

FIG. 10B is an image illustrating a diversity-based mask of learned motion associated with the image of FIG. 10A;

FIG. 10C is an image illustrating a diversity-based mask of learned motion associated with the image of FIG. 10A;

FIG. 10D is an image illustrating a diversity-based mask of learned motion associated with the image of FIG. 10A;

FIG. 10E is an image illustrating a current frame of a video in one example;

FIG. 10F is an image illustrating a diversity-based mask of learned motion associated with the image of FIG. 10E;

FIG. 10G is an image illustrating a diversity-based mask of learned motion associated with the image of FIG. 10E;

FIG. 10H is an image illustrating a diversity-based mask of learned motion associated with the image of FIG. 10E;

FIG. 10I is an image illustrating a current frame of a video in one example;

FIG. 10J is an image illustrating a diversity-based mask of learned motion associated with the image of FIG. 10I;

FIG. 10K is an image illustrating a diversity-based mask of learned motion associated with the image of FIG. 10I;

FIG. 10L is an image illustrating a diversity-based mask of learned motion associated with the image of FIG. 10I;

FIG. 11A is an image illustrating a current frame of a video in one example;

FIG. 11B is an image illustrating a feature map associated with feature(s) extracted from a reference frame associated with the current frame of FIG. 11A and warped by a decoded motion vector;

FIG. 11C is an image illustrating a feature map associated with feature(s) extracted from a reference frame associated with the current frame of FIG. 11A and warped by a learned motion;

FIG. 11D is an image illustrating a current frame of a video in one example;

FIG. 11E is an image illustrating a feature map associated with feature(s) extracted from a reference frame associated with the current frame of FIG. 11D and warped by a decoded motion vector;

FIG. 11F is an image illustrating a feature map associated with feature(s) extracted from a reference frame associated with the current frame of FIG. 11D and warped by a learned motion;

FIG. 11G is an image illustrating a current frame of a video in one example;

FIG. 11H is an image illustrating a feature map associated with feature(s) extracted from a reference frame associated with the current frame of FIG. 11G and warped by a decoded motion vector;

FIG. 11I is an image illustrating a feature map associated with feature(s) extracted from a reference frame associated with the current frame of FIG. 11G and warped by a learned motion.

DETAILED DESCRIPTION

Figure 1:
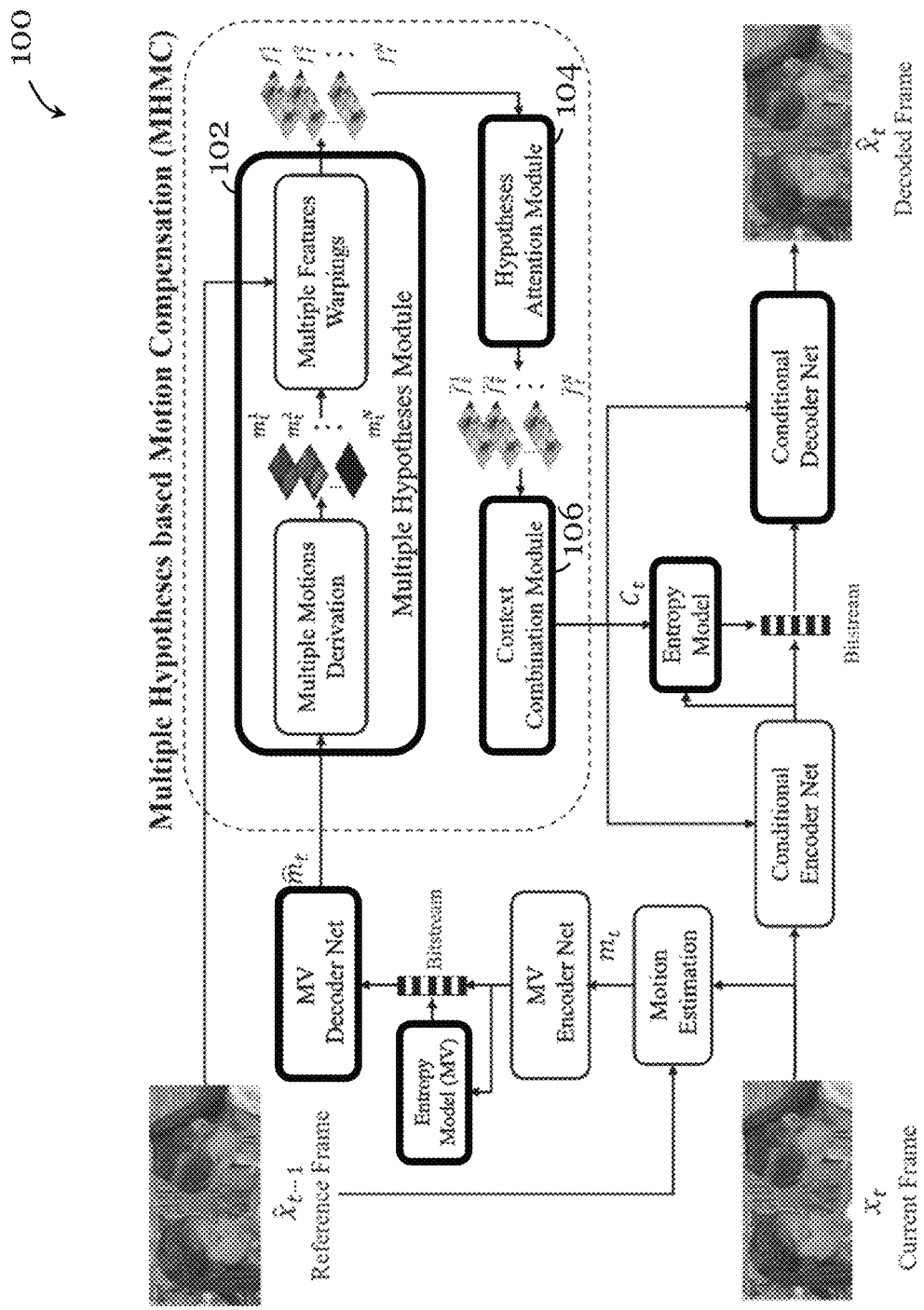
FIG. 1 is a schematic diagram of a framework for facilitating machine-learning based media compression in one embodiment of the invention.

Based on the above background, inventors of the present invention have devised, through research, experiments, and/or trials, in some embodiments of the invention, a multiple hypotheses based motion compensation for the learned video compression framework. The framework is at least partly motivated by multiple hypotheses philosophy in traditional video compression, which generates multiple predictions for the current frame to enhance the prediction efficiency. In some embodiments of the invention, to avoid the overhead regarding compressing and transmitting multiple motion maps, the decoded motion is used to generate multiple motions through a neural network to avoid significant bits increment for representing multiple motions. In some embodiments of the invention, to better mine the information in the multiple hypotheses, an attention module or an attention based mechanism is used to adjust the contributions (e.g., weights) of different hypotheses. In some embodiments of the invention, the combination module fuses the weighted features to produce efficient temporal prior for the compression of the current frame. Some example contributions of some embodiments of the invention include the following. In some embodiments, there is provided a multiple hypotheses based motion compensation, which aims to generate multiple motions and warped features by leveraging the decoded motion in the learned video compression. Given the multiple warpings based on the multiple hypotheses, sufficiently aligned features are produced, thereby better utilizing multiple reference samples in the reference frame for motion compensation. In some embodiments, there is provided a hypotheses attention module used to learn the weights of different hypotheses, to explore the relationship between features warped from different motions with the squeeze-and-excitation layer and the multi-scale network. In some embodiments, a context combination module is used for generating effective contexts by merging weighted warped features.

Inventors of the present invention have, through their research, experiments, and/or trials, learned about some example learned image/video compression techniques and some background related to multiple hypotheses in video coding.

In terms of learned image compression, the inventors have realized the following. Traditional image compression standards, such as JPEG, JPEG2000, and BPG, leverage hand-crafted (manual) transformation, quantization, and entropy model to remove spatial and statistical redundancies in natural images. However, the hand-crafted components in traditional image codecs cannot be jointly optimized and may lead to performance degradation. Recently, learned image compression methods have been developed by applying recurrent neural networks (RNNs) or convolutional neural networks to realize data-driven compression. Some of the recurrent neural network based methods are arranged to build the recurrent encoder-decoder to compress the images progressively. For example, in J. Balle et al., "End-to-end optimized image compression", a convolutional neural network based encoder-decoder structure with generalized divisive normalization and artificial neural network based probabilities estimation is presented, which surpasses the JPEG2000 in terms of the compression efficiency. For example, in J. Balle et al., "Variational image compression with a scale hyperprior", a zero-mean Gaussian distribution is utilized to model the latent codes, where a scale hyperprior network is introduced to estimate the standard deviations. For example, in Minnen et al., "Joint autoregressive and hierarchical priors for learned image compression", a more efficient entropy model with the consideration of the context of the latent codes is applied. For example, in He et al., "Checkerboard context model for efficient learned image compression", a checkerboard context model is used to accelerate the decoding speed.

In terms of learned video compression, the inventors have realized the following. First, several learned video compression methods have been developed. For example, Wu et al., "Video compression through image interpolation", uses bi-directional frames to generate the prediction for the current frame by learning based interpolation, and the residues between the current frame and the prediction are encoded. For example, in Djelouah et al., "Neural inter-frame compression for video coding", optical flow estimation is introduced to improve the prediction from the previous and future frames. For example, in Habibian et al., "Video compression with rate-distortion autoencoders" and Pessoa et al., "End-to-end learning of video compression using spatio-temporal autoencoders", a 3D auto encoder-decoder is leveraged to compress stacks of frames simultaneously. For example, Lu et al, "DVC: An end-to-end deep video compression framework", has presented an end-to-end optimized video compression method DVC, where all the components of the hybrid video coding framework are replaced with neural networks to make the encoder-decoder learnable. For example, Lu et al., "Content adaptive and error propagation aware deep video compression", considers the error propagation problem in DVC and further discloses an error propagation aware and content adaptive approach, where the rate-distortion loss of multiple frames is minimized and online updating is applied. For example, in Lin et al., "M-LVC: Multiple frames prediction for learned video compression", a multiple reference frames based learned video compression framework (M-LVC) is introduced. For example, Hu et al., "Improving deep video compression by resolution-adaptive flow coding", discloses adaptive selection of the optical flow with the optimal resolution on frame and block level. For example, Agustsson et al., "Scale-space flow for end-to-end optimized video compression", discloses the scale-space flow for learned video compression. For example, Yang et al., "Learning for video compression with hierarchical quality and recurrent enhancement", presents hierarchical learned video compression (HLVC) with the hierarchical structure and the RNNs based enhancement. For example, Yang et al., "Learning for video compression with recurrent auto-encoder and recurrent probability model", further discloses RNNs based learned video compression (RLVC) with the recurrent encoder-decoder and recurrent entropy model for utilizing the long term information. For example, in Hu et al., "FVC: A new framework towards deep video compression in feature space", a feature-space video compression framework (FVC) with the deformable convolution based motion estimation and multiple frames based feature fusion is disclosed. For example, Li et al., "Deep contextual video compression", introduces the conditional coding based learned video compression (DCVC), where the temporal contexts are utilized as conditions for compression instead of signaling the temporal residuals.

In terms of multiple hypotheses in video coding, the inventors have realized the following. Inter prediction is important for video coding that aims to remove temporal redundancy. For example, the earlier block based video coding standard H.261 utilized one motion vector when predicting the current block. For example, in Wu et al., "Joint estimation of forward and backward motion vectors for interpolative prediction of video", to further improve the inter prediction performance, two hypotheses prediction has been introduced by leveraging the bi-directional frames with two motion vectors. For example, in Orchard et al., "Overlapped block motion compensation: An estimation-theoretic approach" and Sullivan, "Multi-hypothesis motion compensation for low bit-rate video coding", multiple hypotheses prediction is developed to investigate the spatial and temporal diversities. Specifically, in Orchard et al, the spatial multiple hypotheses method introduces the overlapped block motion compensation (OBMC), where the motion vectors of the current sample and neighboring samples are used to produce the final prediction. Specifically, a multiple hypotheses expectation based framework is provided to achieve temporal multiple hypotheses prediction. For example, in Flierl et al., "A locally optimal design algorithm for block-based multi-hypothesis motion-compensated prediction", a locally designed algorithm for optimal selecting the hypotheses under the rate-distortion constraint is disclosed. For example, in Kung et al., "Multi-hypothesis motion compensated prediction (mhmcp) for error-resilient visual communication" and Kung et al., "Analysis of multi-hypothesis motion compensated prediction for robust video transmission", the analyses of the rate-distortion performance of the multiple hypotheses prediction regarding the number of hypotheses and the coefficients are presented. For example, Wang et al., "Multi-hypothesis prediction based on implicit motion vector derivation for video coding", discloses deriving the remaining hypotheses from the first hypothesis without signaling additional motion bits.

Based on the above, inventors of the invention have realized, that although the multiple hypotheses based prediction has been investigated and exploited in traditional video coding, the utilization of multiple hypotheses mechanism in learned video compression is unknown/unexplored. Based on the above, inventors of the invention have devised, for some embodiments of the invention, a multiple hypotheses based learned video compression method to improve the motion compensation efficiency, where multiple motions and warped features are learned to sufficiently exploit the temporal information in the reference frame.

FIG. 1 shows a framework 100 for facilitating machine-learning based media compression in one embodiment of the invention. The framework 100 in this embodiment is built upon the DCVC framework as disclosed in Li et al., "Deep contextual video compression", the entire content of which is incorporated herein by reference. As the skilled person will appreciate, DCVC is a conditional coding based learned video compression, which utilizes the temporal features instead of the residuals in the pixel domain as conditions. The framework 100 includes the basic modules of conditional coding based video compression (in Li et al.) and additional modules. In this embodiment, the encoder side includes all the illustrated modules whereas the decoder side only includes the modules with thicker borders.

An overview of the framework 100 is now provided with reference to FIG. 1. In this embodiment, the motion vector $m_t$ between the current frame $x_t$ and the reference frame $\hat{x}_{t-1}$ is estimated by the motion estimation module based on a spatial pyramid network (SpyNet), e.g., as disclosed for example in Ranjan et al., "Optical flow estimation using a spatial pyramid network". The motion vector $m_t$ is then fed to the motion vector (MV) encoder net with a hyper prior based entropy model to obtain the compact motion vector bitstreams. The reconstructed motion vector $m_t$ can be obtained at the decoder side, by processing the compact motion vector bitstreams using a motion vector (MV) decoder net. The reconstructed motion vector $\hat{m}_t$ can then be processed by the multiple hypotheses module 102 to obtain multiple aligned features $f_t^1, f_t^2, \ldots, f_t^N$ with temporal information. In the multiple hypotheses module 102, as will be explained in further detail below, multiple motions are generated from the reconstructed motion vector $\hat{m}_t$, and these multiple motions are warped with the extracted feature of the reference frame $\hat{x}_{t-1}$ to provide multiple aligned (motion-warped) features $f_t^1, f_t^2, \ldots, f_t^N$. In this embodiment, the framework 100 also includes a hypotheses attention module 104, which processes the aligned features $f_t^1, f_t^2, \ldots, f_t^N$ considering channel-wise and spatial-wise correlations to provide multiple weighted features $\tilde{f}_t^1, \tilde{f}_t^2, \ldots, \tilde{f}_t^N$. The weighted features $\tilde{f}_t^1, \tilde{f}_t^2, \ldots, \tilde{f}_t^N$ are then fed to a context combination module 106 to generate an efficient context $C_t$. The context $C_t$ with rich temporal prior of the reference can then be employed by the conditional encoder net, conditional decoder net, and entropy model as efficient conditions. In this embodiment, the current frame $x_t$ is compressed through the conditional encoder net with the auto-regressive entropy model considering the hyper and temporal prior to produce the compact bitstreams. The compact bitstreams are decoded through the conditional decoder net to obtain the decoded frame $\hat{x}_t$ corresponding to a compressed frame of the current frame $x_t$. Specifically, the decoded frame $\hat{x}_t$ is reconstructed by parsing the compact strings with the conditional decoder net. The decoded frame $\hat{x}_t$ can be used as the reference frame (in place of the current frame $x_t$) for the compression of the next frame $x_{t+1}$.

Figure 2:
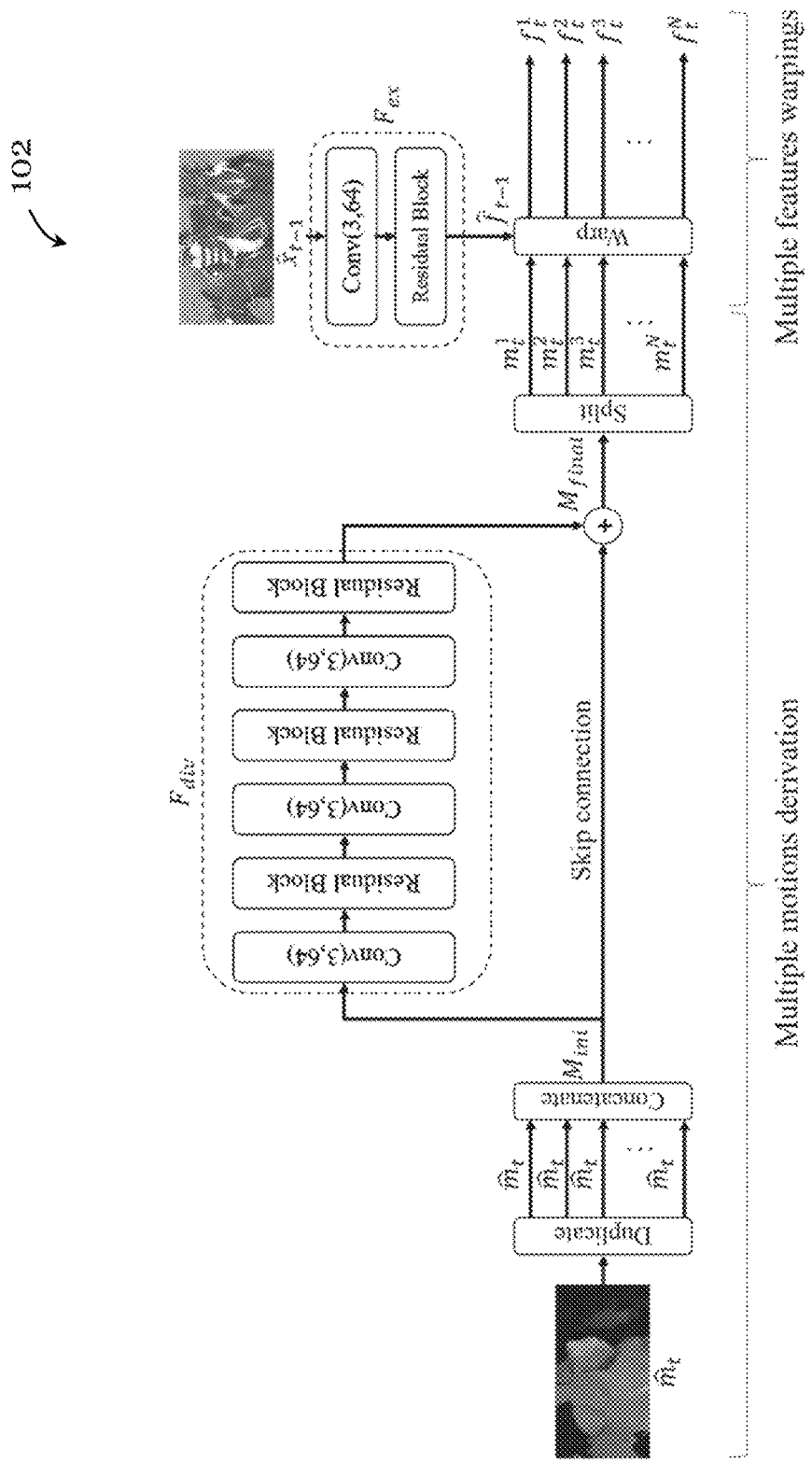
FIG. 2 is a schematic diagram of the multiple hypothesis module of the framework of FIG. 1 in one embodiment of the invention.

FIG. 2 illustrates the multiple hypotheses module 102 (MHM) in one embodiment of the invention. The multiple hypotheses module 102 includes multiple motions derivation portion and a multiple features warpings portion, which provide a multiple hypotheses mechanism to enhance the efficiency of motion compensation. In this embodiment, in FIG. 2, the residual block includes two convolution layers, where the kernel size is 3×3, the number of output channel is 64, and the first convolution layer employs the ReLU activation.

In this embodiment, the multiple motions derivation portion aims to derive multiple motions from the decoded motion $\hat{m}_t$, to explore more correlated samples from the reference frame. Specifically, in the multiple motions derivation portion, the decoded motion $\hat{m}_t$ is first duplicated and concatenated among channels to form an initial multiple motions matrix:

$$M_{ini} = \text{concat}(\text{duplicate}(\hat{m}_t)) \quad (1)$$

A small neural network with convolutions and residual blocks is used to characterize the motion diversities. A skip connection is utilized, and the diversities are added to the initial multiple motions matrix to generate the final multiple motions matrix:

$$M_{final} = M_{ini} + F_{div}(M_{ini}). \quad (2)$$

The final multiple motions matrix is split into multiple motions $m_t^1, m_t^2, \ldots, m_t^N$;

$$m_t^1, m_t^2, \ldots, m_t^N = \text{split}(M_{final}) \quad (3)$$

where N is the number of the motions, which will be discussed in greater detail below.

FIGS. 3A to 3H illustrate the visualization of the decoded motions (FIG. 3A), the current frame (FIG. 3B), and the motions generated by the multiple motions derivation (FIGS. 3C to 3H).

As shown in FIGS. 3A to 3H, the motions $m_t^1, m_t^2, m_t^3, m_t^4, m_t^5$, and $m_t^6$ produced by multiple motions derivation hare a similar structure with the decoded motion $\hat{m}_t$. It indicates that each sample in the current frame can refer to multiple samples in the reference frame. Moreover, multiple motions can introduce a larger temporal receptive area, which is particularly useful for the prediction of the objects with complex motions.

The multiple features warpings portion is arranged to perform multiple features warpings to produce multiple warped features as multiple hypotheses. In this embodiment, the feature $\hat{f}_{t-1}$ is extracted from the reference frame $\hat{x}_{t-1}$:

$$e, cir f_{t-1} = F_{ex}(\hat{x}_{t-1}). \quad (4)$$

Then, the multiple features $f_t^1, f_t^2, \ldots, f_t^N$ are warped by utilizing $\hat{f}_{t-1}$ and $m_t^1, m_t^2, \ldots, m_t^N$, based on:

$$f_t^k = \text{warp}(\hat{f}_{t-1}, m_t^k), k=1,2, \ldots, N. \quad (5)$$

Specifically, $f_t^1$ is warped by using $\hat{f}_{t-1}$ and $m_t^1 f_t^2$ is warped by using $\hat{f}_{t-1}$ and $m_t^2$, and so on.

FIGS. 4A to 4H illustrate the visualization of the reference frame (FIG. 4A), the current frame (FIG. 4B), the feature extracted from the reference frame (FIG. 4C: the feature $\hat{f}_{t-1}$ from the reference frame), the feature warped by the decoded motion (FIG. 4D), and the features warped by the learned motions (FIGS. 4E to 4H: the feature $f'_t$ warped by the decoded motion $\hat{m}_t$, and the features $f_t^1$, $f_t^2$, $f_t^3$, $f_t^4$ warped by $m_t^1$, $m_t^2$, $m_t^3$, $m_t^4$, respectively. These features are shown to demonstrate the effectiveness of the multiple features warpings.

As can be observed from FIGS. 4A to 4H, the region around the neck of the horse in $f'_t$ may have lost some details, but these lost details could be recovered in the features $f_t^1$, $f_t^2$, $f_t^3$, $f_t^4$. Generally, in this embodiment, multiple features warpings can involve more information to obtain better predictions. It should be noted that multiple separate spatial warpings followed by a 2D convolution can be considered equivalent to the deformable convolution. This suggests that the multiple features warpings in this embodiment can achieve similar performance as deformable convolution but without introducing additional signaling overheads.

Figure 5:
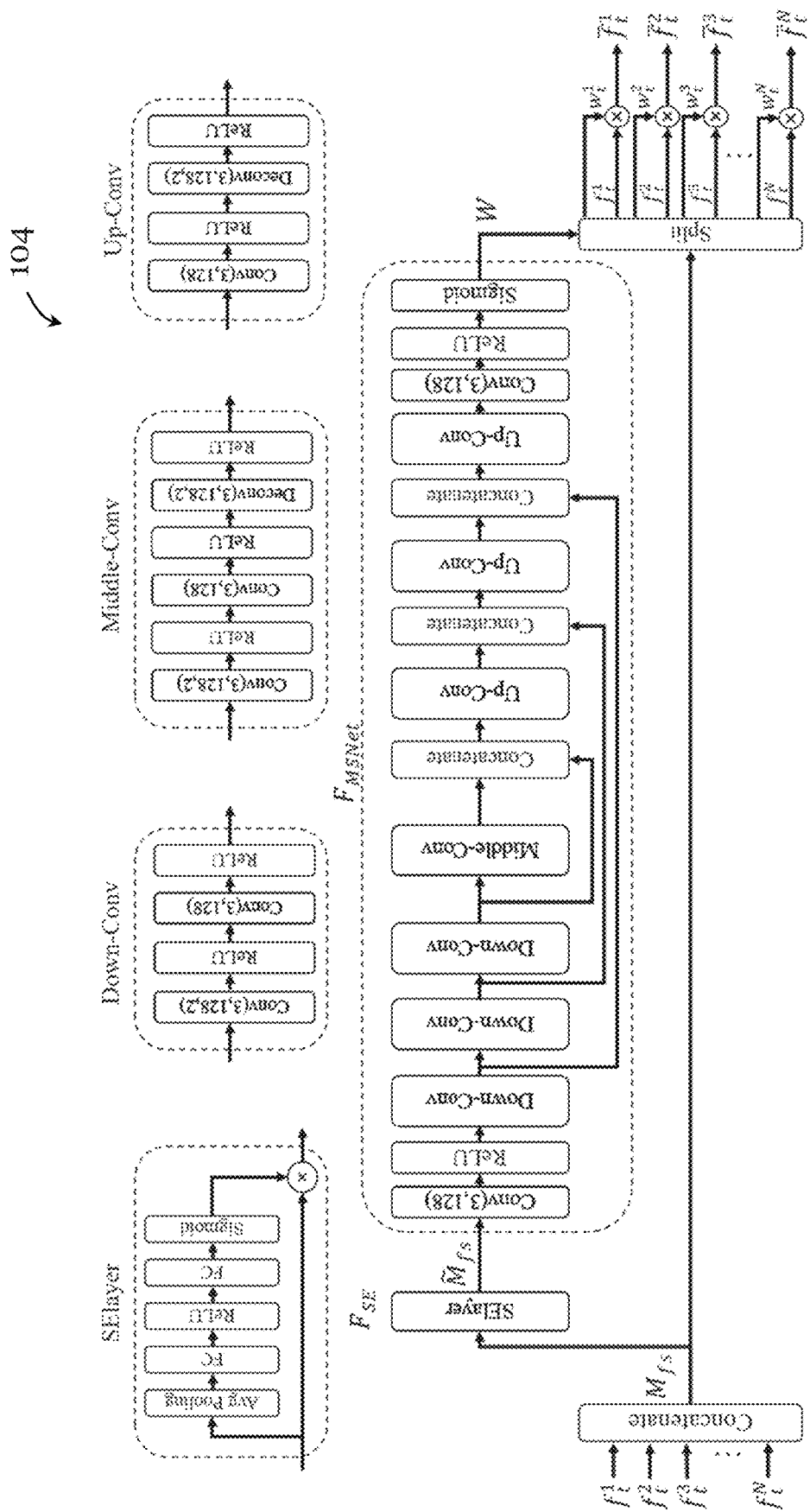
FIG. 5 is a schematic diagram of the hypothesis attention module of the framework of FIG. 1 in one embodiment of the invention.

FIG. 5 illustrates the hypotheses attention module 104 (HAM) in one embodiment of the invention. In this embodiment, the hypotheses attention module 104 includes a neural network with a squeeze-and-excitation layer (SElayer) and a multi-scale network. The hypotheses attention module 104 is applied to explore the relationship among the multiple hypotheses by utilizing the channel based squeeze-and-excitation layer and the multi-scale network. The multiple aligned (motion-warped) features produced by the multiple hypotheses module 102 provide temporal information. However, these multiple aligned features produced by the multiple hypotheses module 102 may not be equally important since different regions of the features may not contribute equally. As such, an attention based mechanism is utilized in the hypotheses attention module 104.

As mentioned, the hypotheses attention module 104 in this embodiment includes a squeeze-and-excitation layer. The squeeze-and-excitation layer (SELayer) is used in this embodiment because it can be used in attention based networks to achieve channel-wise recalibration. In this embodiment, the multiple aligned features $f_t^1$, $f_t^2$, ..., $f_t^N$ are concatenated to form a feature matrix $M_{fs}$ and fed to the SELayer:

$$M_{fs}=\text{concat}(f_t^1, f_t^2, \ldots, f_t^N). \tag{6}$$

In this embodiment, the squeeze-and-excitation layer performs a series of operations, including average pooling, full connected layer (FC), ReLU, and sigmoid. The channel weights are calculated by the squeeze-and-excitation layer and applied to recalibrate each channel of the input features:

$$\tilde{M}_{fs}=F_{SE}(M_{fs}). \tag{7}$$

As mentioned, the hypotheses attention module 104 in this embodiment includes a multi-scale network. The multi-scale network (MSNet) is applied to generate the weights for each aligned feature, to leverage the multi-scale characteristics. In the multi-scale network in this embodiment, the recalibrated features $\tilde{M}_{fs}$ are fed to a convolution layer with ReLU activation. Then, three down-convolution (Down-Conv) blocks are stacked to extract three scales features, where each Down-Conv block contains a convolution with stride 2 for downsampling followed by a ReLU and a convolution with a ReLU. Following the Down-Conv blocks, the middle-convolution (Middle-Conv) block is applied to obtain the fourth scale features and the upsampled features. Symmetrically, three up-convolution (Up-Conv) blocks are introduced successively, each composed of a convolution layer with a ReLU, and a deconvolution layer with stride 2 followed by a ReLU. Each Up-Conv block takes the concatenation of the features produced by the previous block and the corresponding scaled features as input. Consequently, the multi-scale information can be utilized. The output features of the last Up-Conv block are subject to a convolution layer with a ReLU. Finally, the sigmoid operation is performed to obtain the weight matrix W. The process of the multi-scale network can be formulated as:

$$W=F_{MSNet}(\tilde{M}_{fs}). \tag{8}$$

In this embodiment, the multiple weighted features $\tilde{f}_t^1, \tilde{f}_t^2, \ldots, \tilde{f}_t^N$ can be obtained by multiplying the input aligned (motion-warped) features $f_t^1, f_t^2, \ldots, f_t^N$ (split from $M_{fs}$) with the weights $w_t^1, w_t^2, \ldots, w_t^N$ split from W:

$$f_t^1, f_t^2, \ldots, f_t^N = \text{split}(M_{fs}) \tag{9}$$

$$w_t^1, w_t^2, \ldots, w_t^N = \text{split}(W) \tag{10}$$

$$\tilde{f}_t^k = f_t^k \times w_t^k, k=1,2,\ldots,N \tag{11}$$

Figure 6:
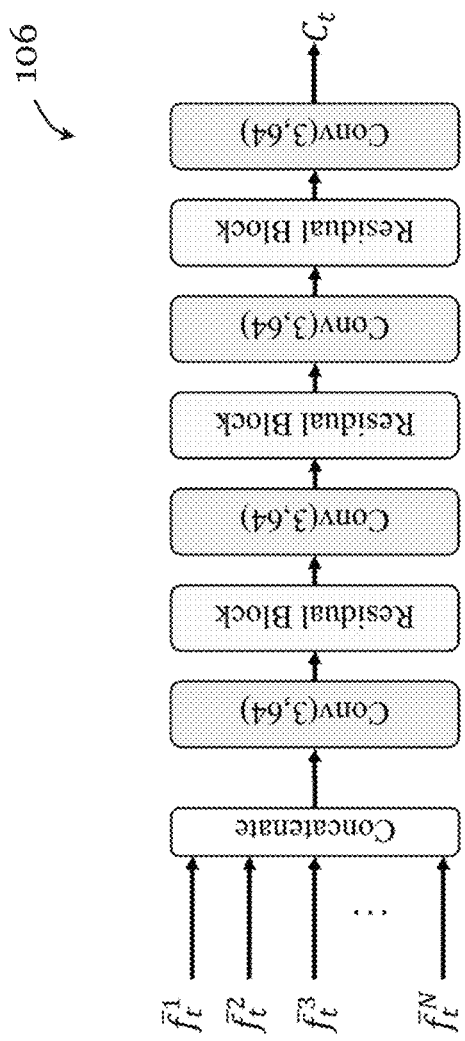
FIG. 6 is a schematic diagram of the context combination module of the framework of FIG. 1 in one embodiment of the invention.

FIG. 6 illustrates the context combination module 106 (CCM) in one embodiment of the invention. In this embodiment, the context combination module 106 includes a neural network with multiple convolutions and residual blocks, arranged to fuse the multiple weighted features to generate the effective context C t based on:

$$C_t = F_{CCM}(\tilde{f}_t^1, \tilde{f}_t^2, \ldots, \tilde{f}_t^N). \tag{12}$$

In this embodiment, the context data with higher dimensional features provides valuable information that facilitates the exploration of correlations between the reference frame and the current frame, such that more efficient conditions are taken into consideration and more redundancies can be effectively eliminated to facilitate compression.

In this embodiment, the loss function including the rate and distortion is optimized during the training stage, which is given by:

$$L = \lambda D + R \tag{13}$$

$$R = R_{mv} + R_{cond} \tag{14}$$

where D denotes the distortion between the current frame $x_t$ and the decoded frame $\hat{x}_t$, where the mean square error (MSE) is used for measuring distortion, R denotes the total bit rates which includes the bit rates of the compact latent codes in motion compression $R_{mv}$ and the bit rates of the compact latent codes in conditional compression $R_{cond}$, and λ is introduced to adjust the balance between rate and distortion.

Various experiments and analysis are performed to verify the performance of the above framework 100 embodiment.

The settings of the experiments performed are as follows. In terms of training data and testing data, in this example, the Vimeo-90k, as discussed in Xue et al., "Video enhancement with task-oriented flow", is utilized to train the proposed models wherein the videos are split into clips and randomly cropped into 256×256 patches. The performance of the method in the above embodiment of the invention is evaluated on UVG dataset (Mercat et al., "UVG dataset: 50/120 fps 4k sequences for video codec analysis and development") and HEVC recommended sequences (Sullivan et al., "Overview of the High Efficiency Video Coding (HEVC) Standard"), which are commonly used in performance evaluation of learned video compression. In terms of implementation, the method based on framework 100 in the above embodiment is implemented with PyTorch (Paszke et al., "Pytorch: An imperative style, high-performance deep learning library") and CompressAI project (Begaint et al., "A pytorch library and evaluation platform for end-to-end compression research"). Four models are trained with A equaling to {256, 512, 1024, 2048} to cover different compression ratios. The Adam optimizer (Kingma et al, "Adam: A method for stochastic optimization") is applied with the initial learning rate of $1e^{-4}$. The batch size is set to 4. The models of the method/framework 100 are trained on an NVIDIA 2080 Ti GPU (11 GB memory).

Various performance evaluations are performed.

In terms of comparison settings, the method/framework 100 of the above embodiment of the invention is compared with some existing learned video compression methods. These existing learned video compression methods include:

OPEN-DVC, disclosed e.g., in Yang et al., "OpenDVC: An open source implementation of the DVC video compression method"

RLVC, disclosed e.g., in Yang et al., "Learning for video compression with recurrent auto-encoder and recurrent probability model", with uni-IPPP setting RLVC, disclosed e.g., in Yang et al., "Learning for video compression with recurrent auto-encoder and recurrent probability model", with bi-directional IPPP setting (bi-IPPP)

DCVC, disclosed e.g., in Li et al., "Deep contextual video compression"

Also, x265 with the LowDelay P (LDP) very-fast setting serves as anchor. All methods follow LDP structure except RLVC bi-directional IPPP setting, which employs bi-directional frames as references.

In this example, the method/framework 100 employs the same coding structure as DCVC, where only one previous frame is referenced and the intra frame is encoded using the models disclosed in Cheng et al. "Learned image compression with discretized gaussian mixture likelihoods and attention modules" provided by CompressAI. In OPEN-DVC, RLVC (uni-IPPP), DVC, and the method/framework of this embodiment, the sizes of a Group of Picture (GOP) are set to 10 and 12 for HEVC recommended sequences and UVG sequences, respectively. The first 10 GOPs of each video are involved for testing, corresponding to the first 100 frames of HEVC recommended sequences and the first 120 frames for UVG sequences. Regarding the RLVC bi-IPPP setting, 13 frames are involved in one GOP and the middle frame employs the former six frames and latter six frames for reference.

As an objective evaluation, the BD-Rate (see, e.g., Bjøntegaard et al., "Calculation of average PSNR differences between RD curves (VCEG-M33)") in terms of PSNR evaluated on RGB channels is applied to measure the rate-distortion performance of the method of the embodiment and the other, existing methods. It should be noted that a negative BD-Rate indicates bit rate reductions in comparison with the anchor. The released models of the existing methods are adopted in our experiments. Table I shows the results of the performance comparison. As shown in Table I, the method of this embodiment achieves 40.31% bit rate reductions on average. Meanwhile, the RLVC (bi-IPPP) and DCVC achieve 12.20% and 26.97% bit rate savings, respectively. OPENDVC and RLVC (uni-IPPP) bring 34.52% and 2.02% bit rate increments compared with x265 (very-fast). As such, the method of this embodiment can benefit from the multiple motions, which serve as useful clues for high-efficiency reconstruction, leading to improved BD-Rate gains when compared with DCVC.

TABLE I

Performance comparisons in terms of BD-rate (anchor: x265 very fast)

| Class | *Sequence | Resolution | OPEN-DVC | RLVC (uni-IPPP) | RLVC (bi-IPPP) | DCVC | This embodiment |
|---|---|---|---|---|---|---|---|
| UVG | Beauty | 1920 × 1080 | −35.6% | −54.3% | −50.9% | −53.3% | −65.3% |
| | Bosphorus | | 17.6% | −15.1% | −28.8% | −14.0% | −38.6% |
| | HoneyBee | | 50.2% | 14.5% | −8.0% | 5.3% | −41.0% |
| | Jockey | | 233.1% | 130.2% | 129.4% | −21.0% | −44.8% |
| | ReadySteadyGo | | 24.5% | −11.3% | −21.4% | −28.4% | −48.9% |
| | ShakeNDry | | −2.7% | −22.7% | −24.6% | −11.6% | −31.8% |
| | YachtRide | | 26.1% | −10.3% | −17.9% | −26.1% | −44.4% |
| | Average | | 44.75% | 4.41% | −3.19% | −21.29% | −45.00% |
| B | BQTerrace | 1920 × 1080 | 25.2% | −1.5% | −18.6% | −38.0% | −47.0% |
| | BasketballDrive | | 69.7% | 22.5% | 10.0% | −37.8% | −43.0% |
| | Cactus | | 7.8% | 18.5% | −33.4% | −39.4% | −48.4% |
| | Kimono | | 3.5% | −26.7% | −32.8% | −43.1% | −48.1% |
| | ParkScene | | −3.2% | −20.2% | −36.2% | −36.8% | −45.1% |
| | Average | | 20.61% | −8.88% | −22.23% | −39.02% | −46.32% |
| C | BQMall | 832 × 480 | 80.3% | 28.9% | 5.1% | −10.2% | −23.4% |
| | BasketballDrill | | 35.2% | 8.4% | −9.5% | −22.5% | −31.7% |
| | PartyScene | | 32.5% | 7.0% | −13.9% | −12.5% | −26.6% |
| | RaceHorses | | 59.1% | 25.8% | 15.5% | −22.4% | −32.6% |
| | Average | | 51.78% | 17.55% | −0.72% | −16.91% | −28.58% |
| D | BQSquare | 416 × 240 | 13.6% | −8.5% | −32.1% | −25.6% | −44.6% |
| | BasketballPass | | 36.3% | 3.5% | −13.8% | −27.4% | −35.5% |
| | Blowing Bubbles | | 10.3% | −9.9% | −29.3% | −27.5% | −37.8% |
| | RaceHorses | | 23.4% | −5.0% | −15.5% | −42.0% | −47.3% |
| | Average | | 20.92% | −4.99% | −22.65% | −30.64% | −41.32% |
| Overall | Average | | 34.52% | 2.02% | −12.20% | −26.97% | −40.31% |

*Details regarding the video sequences listed in Table I can be found, e.g., in Bossen, JCT-VC, "HM common test conditions and software reference configurations," in JCTVC-L1100, January 2013 and Mercat et al., "UVG dataset: 50/120 fps 4k sequences for video codec analysis and development").

Regarding the rate-distortion performance on individual video sequence, it is noted that the method of this embodiment can achieve 41.0% bit rate savings on "HoneyBee" sequence, whereas DCVC introduces 5.3% bit rate loss compared with the anchor.

Figure 7:
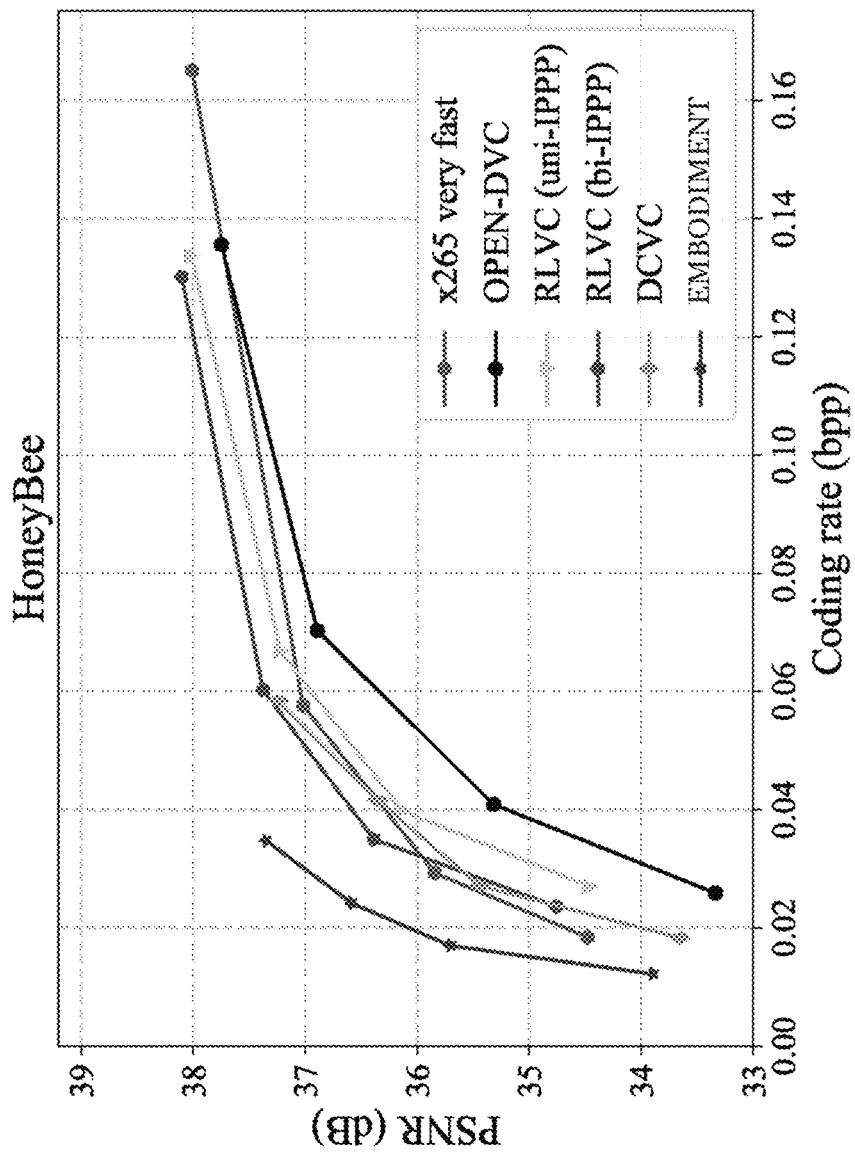
FIG. 7 is a graph showing rate-distortion performance (peak signal-to-noise ratio (PSNR) vs coding rate) of the method in one embodiment of the invention and some existing methods in processing the "HoneyBee" sequence.
Figure 8A:
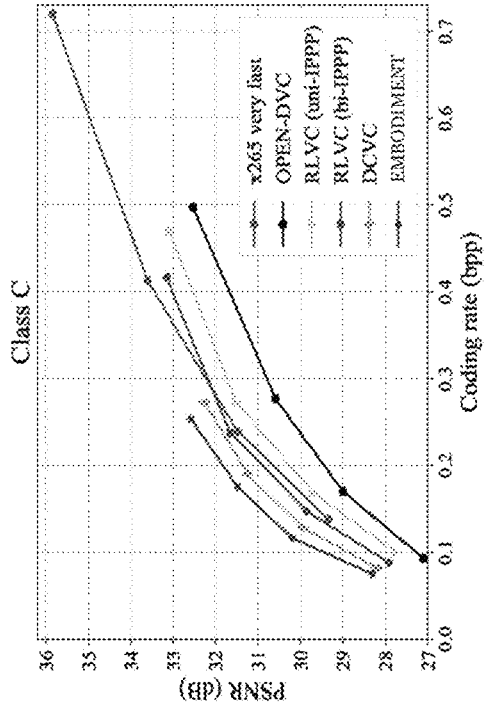
FIG. 8A is a graph showing rate-distortion performance (peak signal-to-noise ratio (PSNR) vs coding rate) of the method in one embodiment of the invention and some existing methods in processing HEVC class B test sequence.
Figure 8B:
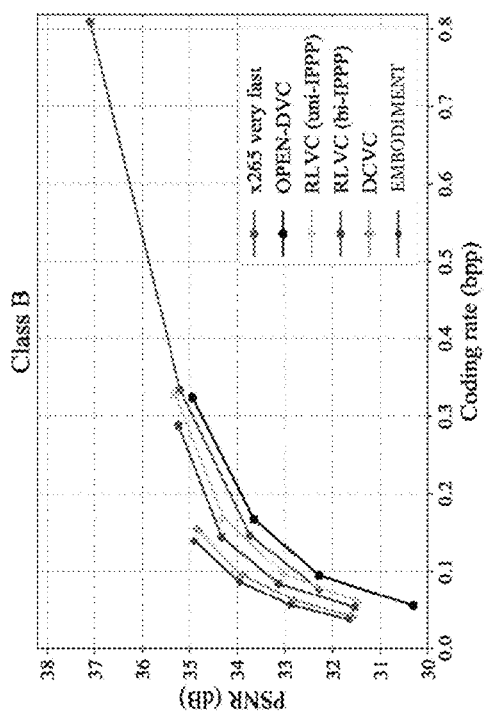
FIG. 8B is a graph showing rate-distortion performance (peak signal-to-noise ratio (PSNR) vs coding rate) of the method in one embodiment of the invention and some existing methods in processing HEVC class C test sequence.
Figure 8C:
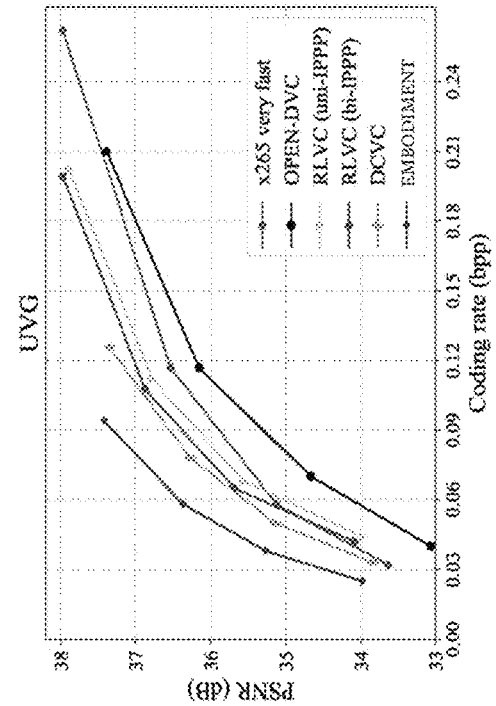
FIG. 8C is a graph showing rate-distortion performance (peak signal-to-noise ratio (PSNR) vs coding rate) of the method in one embodiment of the invention and some existing methods in processing HEVC class D test sequence.
Figure 8D:
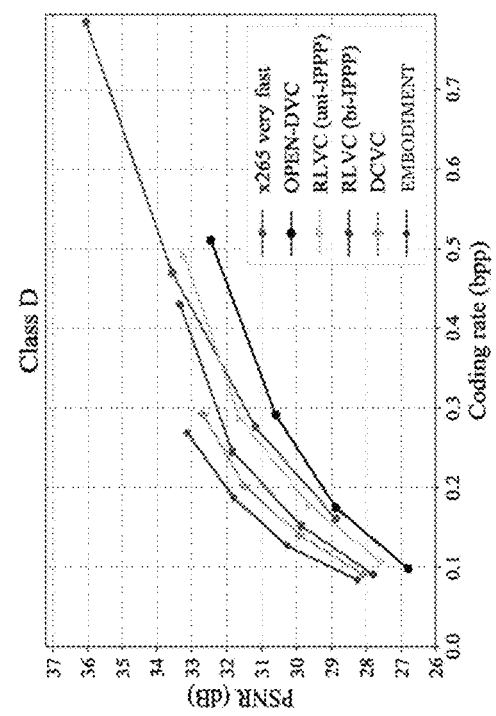
FIG. 8D is a graph showing rate-distortion performance (peak signal-to-noise ratio (PSNR) vs coding rate) of the method in one embodiment of the invention and some existing methods in processing UVG test sequence.
Figure 9A:
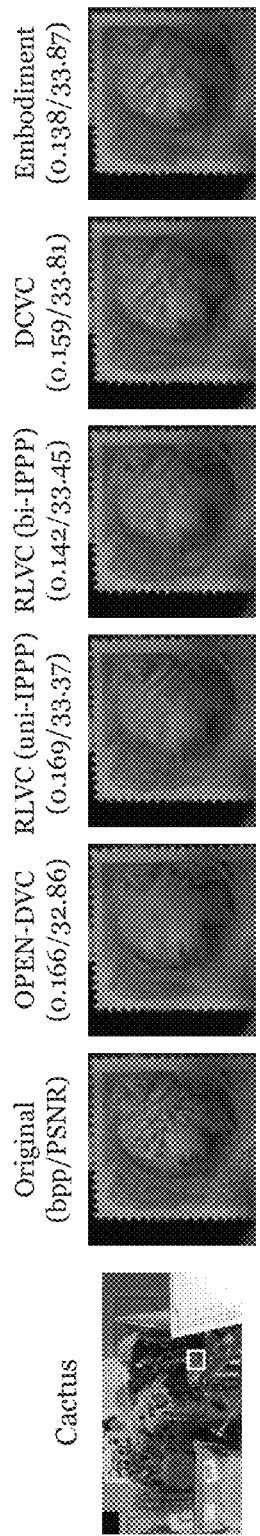
FIG. 9A is a series of images showing subjective quality comparisons of the method in one embodiment of the invention and some existing methods in processing the "Cactus" sequence.
Figure 9B:
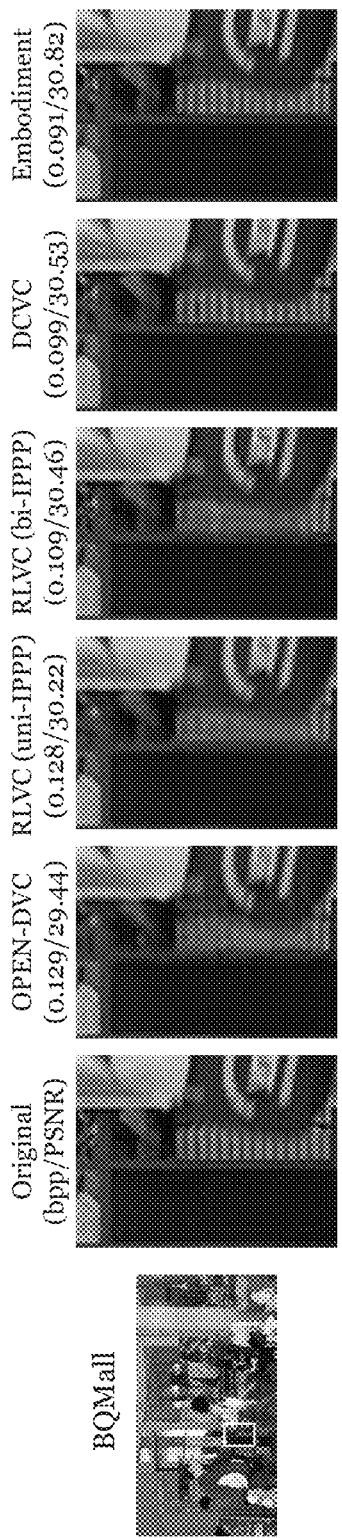
FIG. 9B is a series of images showing subjective quality comparisons of the method in one embodiment of the invention and some existing methods in processing the "BQMall" sequence.
Figure 9C:
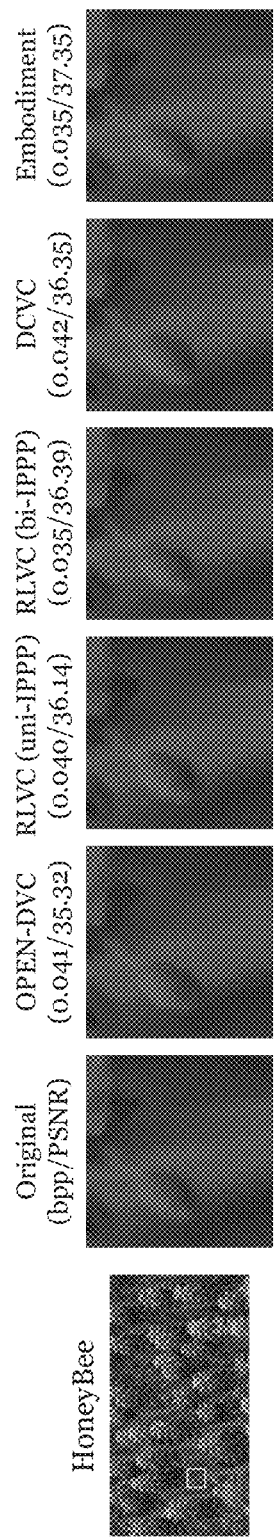
FIG. 9C is a series of images showing subjective quality comparisons of the method in one embodiment of the invention and some existing methods in processing the "HoneyBee" sequence.
Figure 9D:
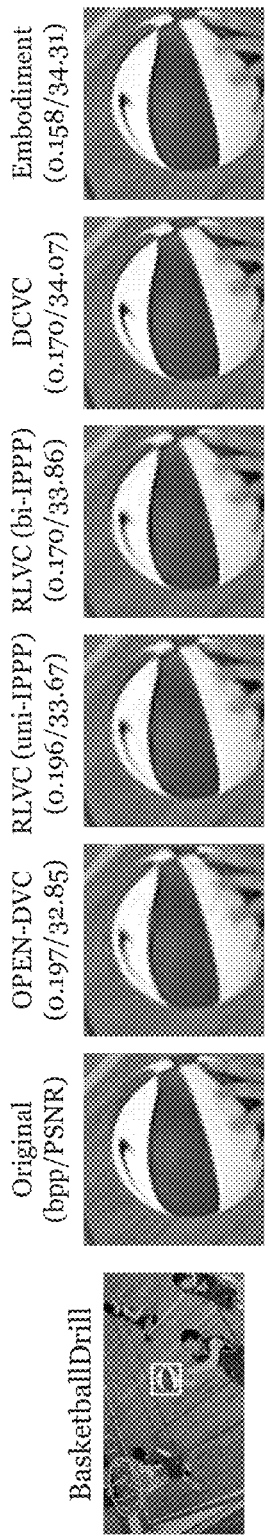
FIG. 9D is a series of images showing subjective quality comparisons of the method in one embodiment of the invention and some existing methods in processing the "BasketballDrill" sequence.

FIG. 7 shows the rate-distortion (RD) performance for the different methods on the "HoneyBee" sequence. In FIG. 7, the bpp and PSNR values are averaged over the compressed frames of the sequence.

As shown in FIG. 7, the method in this embodiment of the invention outperforms other existing methods. Existing learned video compression schemes may lead to inferior rate-distortion performance compared with the ×265 (very fast) at lower bit rates.

FIGS. 8A to 8D show the RD performance for the different methods on HEVC Class B, HEVC Class C, HEVC Class D, and UVG datasets. The bpp and PSNR values are averaged on each class.

It can be seen that for "Bosphorus", "ShakeNDry", "PartyScene", "BQSquare", and "BlowingBubbles" sequences, DCVC is inferior to RLVC (bi-IPPP), since RLVC (bi-IPPP) utilizes multiple frames as references to improve the performance while DCVC only employs a single reference frame. However, the method of this embodiment, with one reference frame, still outperforms RLVC (biIPPP) method for each sequence. This shows the generalization ability of the method of this embodiment, as the multiple hypotheses mechanism provides more informative candidates for better alignment which guarantees stable responses to different video contents. The extended matching area and the multiple responses can lead to a more robust and improved performance compared to the existing methods.

Referring to FIGS. 8A to 8D, it can be seen that the method of this embodiment generally outperforms existing methods, especially on UVG test sequences with various contents and more complex motions. The experimental results show that the method of this embodiment can significantly improve the coding performance.

FIGS. 9A to 9D illustrate subjective quality comparisons on selected frames of the "Cactus" (FIG. 9A), "BQMall" (FIG. 9B), "HoneyBee" (FIG. 9C), and "BasketballDrill" (FIG. 9D) sequences. In FIGS. 9A to 9D, some regions of the frames are cropped and enlarged for better visualization. The original frames as well as the patches cropped from the frames decoded by OPEN-DVC, RLVC (uni-IPPP), RLVC (bi-IPPP), DCVC, and the method of this embodiment are shown. From FIGS. 9A to 9D, it can be observed that the method of this embodiment can generally achieve better visual quality with similar bit rates. More specifically, for the "Cactus" sequence, the reconstructed frame of the method of this embodiment has similar perceptual quality with DCVC but consumes less bits. Compared to RLVC (bi-IPPP), more details around the face in the stamp are reconstructed by the method of this embodiment.

Complexity analyses are performed on the machine with one NVIDIA 2080 Ti GPU and Intel(R) Xeon(R) Silver 4210 CPU@2.20 GHz. More specifically, the method of this embodiment and DCVC are executed on CPU since both methods employ the auto-regressive entropy model, which is not parallelizable. For OPEN-DVC, both the encoding and decoding are performed on the NVIDIA 2080 Ti GPU. For RLVC (uni-IPPP) and RLVC (bi-IPPP) methods, the encoding is tested on GPU, while the decoding is tested on CPU to guarantee the correct decoding.

Videos with resolution of 240 p and 480 p are involved for complexity analyses. Table II shows the encoding time and decoding time of one frame for different methods. For a 240 p frame, the encoding time and the decoding time is 0.47 s and 0.29 s with OPEN-DVC. Moreover, for RLVC (uni-IPPP), the encoding time and decoding time for one 240 p frame is 3.39 s and 8.48 s. Similar encoding time and decoding time for RLVC (bi-IPPP) can be seen, which is 3.24 s and 8.56 s. For DCVC, the encoding time and decoding time for one 240 p frame is 7.02 s and 3.11 s. Compared with DCVC, higher complexity of the method of this embodiment can be observed, where the encoding time and decoding time for one 240 p frame is 17.49 s and 9.58 s. The encoding and decoding complexity of the 480 p videos is also depicted in Table II.

TABLE II

Encoding time and decoding time for one frame in 240p and 480p videos (the time measured on GPU is underlined)

| Method | 240p | | 480p | |
| --- | --- | --- | --- | --- |
| | Enc(s) | Dec(s) | Enc(s) | Dec(s) |
| OPEN-DVC | 0.47 | 0.29 | 0.82 | 0.52 |
| RLVC (uni-IPPP) | 3.39 | 8.48 | 12.07 | 36.75 |
| RLVC (bi-IPPP) | 3.24 | 8.56 | 12.38 | 38.08 |
| DCVC | 7.02 | 3.11 | 39.55 | 19.09 |
| This embodiment | 17.49 | 9.58 | 99.86 | 52.34 |

Regarding the sizes of different models, as shown in Table III, the total number of parameters of the network in the method of this embodiment is 11.8 M whereas OPENDVC, RLVC, and DCVC have around 5.2 M, 19.1 M, and 7.9 M parameters respectively.

TABLE III

Comparisons of number of parameters

| Method | Parameters number (M) |
| --- | --- |
| OPEN-DVC | 5.2 |
| RLVC | 19.1 |
| DCVC | 7.9 |
| This embodiment | 11.8 |

Ablation studies are conducted to demonstrate the effectiveness of different modules in the framework boo in the above embodiment. In the ablation studies in this example, DCVC is selected as the anchor since the method of this embodiment is built upon the DCVC framework. Two combinations (MHM+CCM) and (MHM+HAM+CCM) are studied since CCM is required to generate the context, and HAM can be readily/removably arranged between MHM and CCM.

In the ablation studies: First, the diversities of multiple learned motions in MHM are investigated to illustrate the capability of the multiple hypotheses in improving the coding performance. Second, the visualization and comparison of the multiple warped features are presented to validate the effectiveness. Third, the influence of the number of the hypotheses in MHM is analyzed. Lastly, the performances of (MHM+CCM) and (MHM+HAM+CCM) are illustrated.

In terms of the diversities of learned motions in MHM: The multiple motions are generated by incorporating the diversities to the decoded motion such that diverse information can be utilized. As shown in FIGS. 3A to 3H, the learned motions may be different from the decoded motion. To show the differences, the diversity mask formulated as follows is calculated:

$$(\text{mask}_t^k)_{i,j} = \begin{cases} 0, & \left|(m_t^k)_{i,j}^x - (\hat{m}_t)_{i,j}^x\right| \leq 1 \text{ and} \\ & \left|(m_t^k)_{i,j}^y - (\hat{m}_t)_{i,j}^y\right| \leq 1, \\ 1, & \left|(m_t^k)_{i,j}^x - (\hat{m}_t)_{i,j}^x\right| > 1 \text{ and} \\ & \left|(m_t^k)_{i,j}^y - (\hat{m}_t)_{i,j}^y\right| > 1 \end{cases}, k = 1, 2, \ldots, N \quad (15)$$

where $(\text{mask}_t^k)_{i,j}$ denotes the mask value for the $k^{th}$ motion $m_t^k$ at the position of (i, j), $(m_t^k)_{i,j}^x$ and $(\hat{m}_t)_{i,j}^x$ denote the values in x dimension of $k^{th}$ motion $m_t^k$ and the decoded motion $\hat{m}_t$ at the position of (i, j), respectively, $(m_t^k)_{i,j}^y$ and $(\hat{m}_t)_{i,j}^y$ denote the values in y dimension of $k^{th}$ motion $m_t^k$ and the decoded motion $\hat{m}_t$ at the position of (i, j), respectively. According to equation (15), the value of the mask at the position of (i, j) is set to 1 when both the absolute differences in x dimension and y dimension of the $k^{th}$ motion $m_t^k$ are larger than 1 compared to the decoded motion $\hat{m}_t$.

FIGS. 10A to 10L illustrate visualization of the diversity masks of the learned motions compared to the decoded motion. FIGS. 10A, 10E, and 10I correspond to different current frames. FIGS. 10B-10D, 10F-10H, 10J-10L correspond to the various corresponding diversity masks of the learned motions. FIGS. 10A to 10L illustrate that the diversities mainly exist at objects with complex and large motions, which require more information to achieve better alignment. It can be seen that the method of the embodiment of the invention focuses more on regions with complicated motions.

In terms of the multiple warped features in MHM: In FIGS. 4A to 4H, an example of the multiple warped features is shown to demonstrate that the warped features can recover details and lost information in comparison to the feature warped with the decoded motion.

FIGS. 11A to 11I present further examples. Specifically, FIGS. 11A to 11I illustrate the visual comparisons of the features warped by the decoded motion and the features warped by the learned motions. FIGS. 11A, 11D, and 11G represent respective current frame (the original frame $x_t$); FIGS. 11B, 11E, and 11H represent corresponding features warped by the decoded motions (the enlarged patch cropped from the feature $\hat{f}_{t-1}$ warped by using the decoded motion); FIGS. 11C, 11F, and 11I represent corresponding features warped by the learned motions (the enlarged patch cropped from the feature $f_t$ warped by using the learned motion). In FIGS. 11A to 11I, the regions of the features, which are very close to areas with large diversity depicted in the diversity mask, are selected to show the alignment capability of the multiple features warping. It can be observed from FIG. 11C that the holes in the pen in FIG. 11A can be remedied. It can be observed from FIG. 10 that the area near the edge of the head in FIG. 11D is smoother. It can be observed from FIG. 11I that the artifacts around the basketball and the cloth in FIG. 11G are reduced.

In terms of the multiple number of the hypotheses in MHM: To investigate the impact of the number of the hypotheses in MHM, in this example, 3, 6, and 9 hypotheses networks, only including the MHM and CCM, are used to evaluate the coding performance. Table IV shows the performance. As shown in Table IV, compared to the anchor DCVC, 12.30%, 12.75%, and 13.12% bit rate savings on average are realized under the 3, 6, and 9 hypotheses settings, respectively. With the increment of the number of the hypotheses, the coding performance is improved. However, it can be observed that the 3 hypotheses network already achieves satisfactory performance. This indicates that while introducing more hypotheses can bring additional information, the information may be redundant since multiple hypotheses are derived from a single decoded motion. In this example the number of the hypotheses is experimentally set to 9 to obtain a good performance.

TABLE IV

Ablation study on the number of hypotheses in terms of bd-rate (anchor: DCVC)

| Classes | 3 hypotheses | 6 hypotheses | 9 hypotheses |
|---|---|---|---|
| B | −10.57% | −10.69% | −10.99% |
| C | −12.70% | −13.41% | −13.66% |
| D | −13.64% | −14.15% | −14.71% |
| Average | −12.30% | −12.75% | −13.12% |

In terms of the effectiveness of HAM: To study the effectiveness of the HAM, the performances of two combinations (MHM+CCM) and (MHM+HAM+CCM) are compared. As shown in Table V, the combination of (MHM+HAM+CCM) achieves 13.75% bit rate reductions on average while the combination of (MHM+CCM) realizes 13.12% bit rate savings on average. Moreover, coding gains can be seen on class B, class C, and class D sequences. The experimental results show that the HAM can improve the performance based on the MHM backbone. It can be observed in this example that the coding gains of HAM are not prominent since the MHM backbone has already achieved an improvement compared to DCVC.

TABLE V

Ablation study on the modules in the framework 100 in terms of bd-rate (anchor: DCVC)

| Class | MHM + CCM | MHM + HAM + CCM |
|---|---|---|
| B | −10.99% | −11.57% |
| C | −13.66% | −14.43% |
| D | −14.71% | −15.25% |
| Average | −13.12% | −13.75% |

In some embodiments of the invention, such as those above, a multiple hypotheses based motion compensation for the learned video compression is developed. The framework in some embodiments include a multiple hypotheses module, a hypotheses attention module (optional), and a context combination module for pursuing improved coding performance. One feature of the above embodiments of the invention is the multiple hypotheses mechanism—through it, diverse information of the reference frame can be utilized to achieve better temporal prior mining. In some examples, multiple motions and warped features can be produced by the multiple hypotheses module for providing various hypotheses, where the sample in the current frame can refer to multiple samples in the reference frame. Moreover, in some examples, the hypotheses attention module is presented to explore the relationship among the multiple hypotheses through the attention based structure. In some examples, the weighted hypotheses are fused by the context combination to produce the effective contexts for improving the compression efficiency. In some embodiments of the invention, the multiple hypotheses module may include a concise network and multiple warpings, which produces multiple motions and warped features for mining sufficient temporal information, to provide various hypotheses inferences from the reference frame. In some embodiments of the invention, to utilize these hypotheses more copiously, the hypotheses attention module can include channel-wised squeeze-and-excitation layer and multi-scale network. In some embodiments of the invention, context combination can be used to fuse the weighted hypotheses to generate effective contexts with powerful temporal priors.

The inventors of the invention have devised that some embodiments of the invention can provide one or more of the following contributions. In some embodiments, the multiple hypotheses based motion compensation for the learned video compression is able to enhance the motion compensation efficiency by providing diverse hypotheses with efficient temporal information fusion. In some embodiments, the multiple hypotheses module can produce multiple motions and warped features for mining sufficient temporal information. In some embodiments, the hypotheses attention module is able to learn the weights of different hypotheses, exploring the relationship between features warped from different motions. In some embodiments, the context combination module can generate effective contexts by merging weighted warped features. Of course, the inventors of the invention have appreciated that some embodiments of the invention may not be limited to these contributions.

The method embodiments of the invention can be practically implemented as a tool, e.g., a software based tool that can be implemented using hardware, for performing or facilitating performing of learned video compression. Some embodiments of the invention can be utilized in video delivery application and video storage system.

Figure 12:
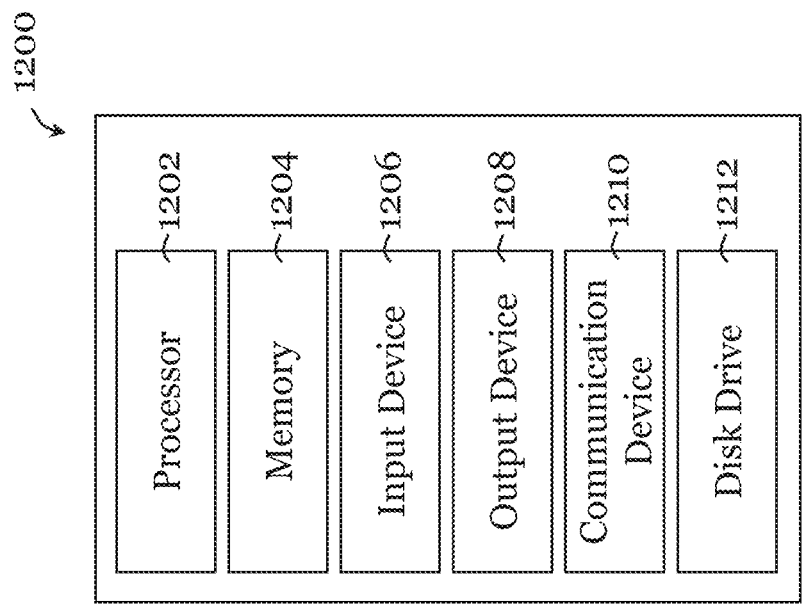
FIG. 12 is a functional block diagram of an example information handling system operable to implement, partly or entirely, method embodiments of the invention.

FIG. 12 shows an example information handling system 1200 that can be used as a server or another type of information processing system in one embodiment of the invention. The information handling system 1200 can be used to perform or facilitate performing of one or more method embodiments of the invention, e.g., the framework 100, in part or entirely. For example, the information handling system 1200 can be used to implement the multiple hypotheses module 102. For example, the information handling system 1200 can be used to implement the hypotheses attention module 104. For example, the information handling system 1200 can be used to implement the context combination module 106. For example, the information handling system 1200 can be used to process bitstreams, perform encoding, perform decoding, etc. The information handling system 1200 can be used to process a media file, such as an image file or a video file (with multiple frames of images).

The information handling system 1200 generally comprises suitable components necessary to receive, store, and execute appropriate computer instructions, commands, and/or codes. The main components of the information handling system 1200 are a processor 1202 and a memory (storage) 1204. The processor 1202 may include one or more: GPU(s), CPU(s), MCU(s), logic circuit(s), Raspberry Pi chip(s), digital signal processor(s) (DSP), application-specific integrated circuit(s) (ASIC), field-programmable gate array(s) (FPGA), and/or any other digital or analog circuitry/circuitries configured to interpret and/or to execute program instructions and/or to process signals and/or information and/or data. The processor 1202 is operable to process data/information using machine learning based methods/models, such as artificial neural networks. The memory 1204 may include one or more volatile memory (such as RAM, DRAM, SRAM), one or more non-volatile memory (such as ROM, PROM, EPROM, EEPROM, FRAM, MRAM, FLASH, SSD, NAND, NVDIMM), or any of their combinations. Appropriate computer instructions, commands, codes, information and/or data may be stored in the memory 1204. The memory 1204 may store one or more artificial neural networks, associated training/testing/validation data, etc. The memory 1204 may store processing results of the processor 1202. Computer instructions for executing or facilitating executing the method embodiments of the invention may be stored in the memory 1204. The processor 1202 and memory (storage) 1204 may be integrated or separated (and operably connected). Optionally, the information handling system 1200 further includes one or more input devices 1206. Examples of such input device 1206 include: keyboard, mouse, stylus, image scanner, microphone, tactile/touch input device (e.g., touch sensitive screen), image/video input device (e.g., camera), etc. Optionally, the information handling system 1200 further includes one or more output devices 1208. Examples of such output device 1208 include: display (e.g., monitor, screen, projector, etc.), speaker, headphone, earphone, printer, additive manufacturing machine (e.g., 3D printer), etc. The display may include a LCD display, a LED/OLED display, or other suitable display, which may or may not be touch sensitive. The information handling system 1200 may further include one or more disk drives 1212 which may include one or more of: solid state drive, hard disk drive, optical drive, flash drive, magnetic tape drive, etc. A suitable operating system may be installed in the information handling system 1200, e.g., on the disk drive 1212 or in the memory 1204. The memory 1204 and the disk drive 1212 may be operated by the processor 1202. Optionally, the information handling system 1200 also includes a communication device 1210 for establishing one or more communication links (not shown) with one or more other computing devices such as servers, personal computers, terminals, tablets, phones, watches, IoT devices, or other wireless computing devices. The communication device 1210 may include one or more of: a modem, a Network Interface Card (NIC), an integrated network interface, a NFC transceiver, a ZigBee transceiver, a Wi-Fi transceiver, a Bluetooth® transceiver, a radio frequency transceiver, a cellular (2G, 3G, 4G, 5G, above 5G, or the like) transceiver, an optical port, an infrared port, a USB connection, or other wired or wireless communication interfaces. Transceiver may be implemented by one or more devices (integrated transmitter(s) and receiver(s), separate transmitter(s) and receiver(s), etc.). The communication link(s) may be wired or wireless for communicating commands, instructions, information and/or data. In one example, the processor 1202, the memory 1204 (optionally the input device(s) 1206, the output device(s) 1208, the communication device(s) 1210 and the disk drive(s) 1212, if present) are connected with each other, directly or indirectly, through a bus, a Peripheral Component Interconnect (PCI) such as PCI Express, a Universal Serial Bus (USB), an optical bus, or other like bus structure. In one embodiment, at least some of these components may be connected wirelessly, e.g., through a network such as the Internet or a cloud computing network. A person skilled in the art would appreciate that the information handling system 1200 shown in FIG. 12 is merely an example and that the information handling system 1200 can have different configurations (e.g., include additional components, has fewer components, etc.) in other embodiments.

Although not required, the embodiments described with reference to the Figures can be implemented as an application programming interface (API) or as a series of libraries for use by a developer or can be included within another software application, such as a terminal or computer operating system or a portable computing device operating system. Generally, as program modules include routines, programs, objects, components and data files assisting in the performance of particular functions, the skilled person will understand that the functionality of the software application may be distributed across a number of routines, objects and/or components to achieve the same functionality desired herein.

It will also be appreciated that where the methods and systems of the invention are either wholly implemented by computing system or partly implemented by computing systems then any appropriate computing system architecture may be utilized. This will include stand-alone computers, network computers, dedicated or non-dedicated hardware devices. Where the terms "computing system" and "computing device" are used, these terms are intended to include (but not limited to) any appropriate arrangement of computer or information processing hardware capable of implementing the function described.

It will be appreciated by persons skilled in the art that numerous variations and/or modifications may be made to the invention as shown in the specific embodiments to provide other embodiments of the invention. The described embodiments of the invention should therefore be considered in all respects as illustrative, not restrictive. Example optional features of some aspects of the invention are set forth in the above summary of the invention. Some embodiments of the invention may include one or more of these optional features (some of which are not specifically illustrated in the drawings). Some embodiments of the invention may lack one or more of these optional features (some of which are not specifically illustrated in the drawings). One or more features in one embodiment and one or more features in another embodiment may be combined to provide further embodiment(s) of the invention. While some of the above embodiments specifically refer to processing of video or video file, it should be appreciated that the invention can likewise be applied to processing of image or image file. The neural networks in the invention are not limited to those specifically illustrated, and can include different types of artificial neural networks operable to perform the same or equivalent function (with the same or different performance). Some embodiments of the method invention can be performed online. Some embodiments of the method invention can be performed offline.

The invention claimed is:

1. A computer-implemented method for facilitating machine-learning based media compression, comprising:
   (a) receiving a decoded motion data set associated with motion-related difference between a first image and a second image;
   (b) processing the decoded motion data set using a neural network to determine a plurality of motion data subsets at decoder side, wherein the neural network comprises convolution layers and residual blocks to generate motion diversities, and the motion diversities are added to the decoded motion data set to generate the plurality of motion data subsets;
   (c) processing the plurality of motion data subsets using one or more features associated with the first image to obtain a plurality of motion-warped feature data sets with temporal information, each of the plurality of motion-warped feature data sets being associated with a respective motion data subset; and
   (d) processing the plurality of motion-warped feature data sets to facilitate generation of context data for facilitating conditional coding based compression of the second image, wherein the step (d) comprises:
   (d1) processing the plurality of motion-warped feature data sets by a hypotheses attention module (HAM) to determine a plurality of attention based weights each associated with a respective one of the plurality of motion-warped feature data sets, and applying each of the plurality of attention based weights to a respective one of the plurality of motion-warped feature data sets to obtain a plurality of attention-weighted motion-warped feature data sets; and
   (d2) processing the plurality of attention-weighted motion-warped feature data sets using a neural network to obtain the context data.

2. The computer-implemented method of claim 1, wherein the motion data set comprises a motion vector.

3. The computer-implemented method of claim 2, wherein the motion vector comprises a reconstructed motion vector $m_r$.

4. The computer-implemented method of claim 3, further comprising:
   determining the reconstructed motion vector $m_r$.

5. The computer-implemented method of claim 4, wherein determining the reconstructed motion vector $m_r$ comprises:
   processing the first image and the second image to determine a first motion vector $m_t$ associated with motion-related difference between the first image and the second image; and
   performing a motion compression operation on the first motion vector $m_t$ to determine the reconstructed motion vector $m_r$;
   wherein the reconstructed motion vector $m_t$ corresponds to a second motion vector.

6. The computer-implemented method of claim 5, wherein the processing includes processing the first image and the second image using a spatial pyramid network (SpyNet) to determine the first motion vector $m_t$.

7. The computer-implemented method of claim 5, wherein the motion compression operation comprises:
   encoding the first motion vector based on a hyper-prior based entropy model to obtain motion data bitstream; and
   decoding the motion data bitstream to obtain the reconstructed motion vector $m_r$.

8. The computer-implemented method of claim 2, wherein (b) comprises:
   (b1) generating a first motion matrix $M_{ini}$ based on the motion vector;
   (b2) processing the first motion matrix $M_{ini}$ using a neural network to determine a motion diversity function $F_{div}$;
   (b3) generating a second motion matrix $M_{final}$ based on the first motion matrix $M_{ini}$ and the motion diversity function $F_{div}$; and
   (b4) processing the second motion matrix $M_{final}$ to obtain the plurality of motion data subsets.

9. The computer-implemented method of claim 8, wherein (b1) comprises:
   duplicating and concatenating the motion vector to obtain the first motion matrix $M_{ini}$.

10. The computer-implemented method of claim 8, wherein (b3) comprises:
    generating a second motion matrix $M_{final}$ based on $M_{final}=M_{ini}+F_{div}(M_{ini})$.

11. The computer-implemented method of claim 8, wherein (b4) comprises:
    splitting the second motion matrix $M_{final}$ into the plurality of motion data subsets.

12. The computer-implemented method of claim 1, wherein each of the plurality of motion data subsets corresponds to a respective motion.

13. The computer-implemented method of claim 1, wherein (c) comprises:
   (c1) extracting the one or more features from the first image; and
   (c2) warping each of the plurality of motion data subsets with the one or more extracted features associated with the first image to obtain the plurality of motion-warped feature data sets.

14. The computer-implemented method of claim 13, wherein (c1) comprises:
   processing the first image using a neural network to extract the one or more features.

15. The computer-implemented method of claim 1, wherein the hypotheses attention module comprises an attention based neural network which comprises a squeeze-and-excitation layer and a multi-scale neural network.

16. The computer-implemented method of claim 15, wherein (d1) comprises:
   generating a feature matrix $M_{fs}$ based on concatenating the plurality of motion-warped feature data sets;
   processing the feature matrix $M_{fs}$ using the squeeze-and-excitation layer to obtain a re-calibrated feature matrix $M_{fs}$; and
   processing the re-calibrated feature matrix $M_{fs}$ using the multi-scale neural network to determine a weight matrix W;
   wherein the weight matrix W includes the plurality of attention based weights.

17. The computer-implemented method of claim 1, wherein the context data is arranged to be applied to an entropy model to facilitate conditional coding based compression of the second image.

18. The computer-implemented method of claim 17, wherein the entropy model is an auto-aggressive entropy model.

19. The computer-implemented method of claim 1, further comprising:
   (e) performing a conditional compression operation on the second image to obtain a compressed second image.

20. The computer-implemented method of claim 19, wherein the conditional compression operation comprises:
   encoding the second image based on an auto-regressive entropy model to obtain a bitstream; and
   decoding the bitstream to obtain the compressed second image.

21. The computer-implemented method of claim 1, wherein the first image is a compressed reference image.

22. The computer-implemented method of claim 1, wherein the first image and the second image correspond to consecutive frames of a video, and wherein the first image corresponds to a frame immediately before the second image.

23. A system for facilitating machine-learning based media compression, comprising:
   one or more processors; and
   memory storing one or more programs configured to be executed by the one or more processors, the one or more programs including instructions for:
   (a) receiving a decoded motion data set associated with motion-related difference between a first image of a video and a second image of the video;
   (b) processing the decoded motion data set using a neural network to determine a plurality of motion data subsets at decoder side, wherein the neural network comprises convolution layers and residual blocks to generate motion diversities, and the motion diversities are added to the decoded motion data set to generate the plurality of motion data subsets;
   (c) processing the plurality of motion data subsets using one or more features associated with the first image to obtain a plurality of motion-warped feature data sets with temporal information, each of the plurality of motion-warped feature data sets being associated with a respective motion data subset; and
   (d) processing the plurality of motion-warped feature data sets to facilitate generation of context data for facilitating conditional coding based compression of the second image, wherein the step (d) comprises:
      (d1) processing the plurality of motion-warped feature data sets by a hypotheses attention module (HAM) to determine a plurality of attention based weights each associated with a respective one of the plurality of motion-warped feature data sets, and applying each of the plurality of attention based weights to a respective one of the plurality of motion-warped feature data sets to obtain a plurality of attention-weighted motion-warped feature data sets; and
      (d2) processing the plurality of attention-weighted motion-warped feature data sets using a neural network to obtain the context data.

24. A non-transitory computer-readable storage medium storing one or more programs configured to be executed by one or more processors, the one or more programs including instructions for performing or facilitating performing of a method for facilitating machine-learning based media compression, the method comprising:
   (a) receiving a decoded motion data set associated with motion-related difference between a first image of a video and a second image of the video;
   (b) processing the decoded motion data set using a neural network to determine a plurality of motion data subsets at decoder side, wherein the neural network comprises convolution layers and residual blocks to generate motion diversities, and the motion diversities are added to the decoded motion data set to generate the plurality of motion data subsets;
   (c) processing the plurality of motion data subsets using one or more features associated with the first image to obtain a plurality of motion-warped feature data sets with temporal information, each of the plurality of motion-warped feature data sets being associated with a respective motion data subset; and
   (d) processing the plurality of motion-warped feature data sets to facilitate generation of context data for facilitating conditional coding based compression of the second image, wherein the step (d) comprises:
      (d1) processing the plurality of motion-warped feature data sets by a hypotheses attention module (HAM) to determine a plurality of attention based weights each associated with a respective one of the plurality of motion-warped feature data sets, and applying each of the plurality of attention based weights to a respective one of the plurality of motion-warped feature data sets to obtain a plurality of attention-weighted motion-warped feature data sets; and
      (d2) processing the plurality of attention-weighted motion-warped feature data sets using a neural network to obtain the context data.

* * * * *